(12) United States Patent
Matsumoto et al.

(10) Patent No.: US 8,433,836 B2
(45) Date of Patent: Apr. 30, 2013

(54) CENTRALIZED MASTER-SLAVE-COMMUNICATION CONTROL SYSTEM AND METHOD WITH MULTI-CHANNEL COMMUNICATION ON THE SAME LINE

(75) Inventors: Isao Matsumoto, Kanagawa (JP); Hidekazu Kikuchi, Kanagawa (JP); Ryuichiro Kawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/805,906

(22) Filed: Aug. 24, 2010

(65) Prior Publication Data

US 2011/0093635 A1  Apr. 21, 2011

(30) Foreign Application Priority Data

Oct. 19, 2009  (JP) ................................. 2009-240773

(51) Int. Cl.
*G06F 13/00*   (2006.01)
(52) U.S. Cl.
USPC ............ 710/109; 710/110; 370/449; 370/451
(58) Field of Classification Search .................. 710/109, 710/110; 370/449, 451, 489; 700/3
See application file for complete search history.

(56) References Cited

U.S. PATENT DOCUMENTS

| | | | | |
|---|---|---|---|---|
| 6,477,140 B1 * | 11/2002 | Uda et al. | ...................... | 370/216 |
| 7,072,803 B2 * | 7/2006 | Viard et al. | ................... | 702/190 |
| 7,673,085 B2 * | 3/2010 | Kuo | ............................... | 710/110 |
| 2007/0150671 A1 * | 6/2007 | Kurland | ........................ | 711/154 |
| 2009/0248931 A1 * | 10/2009 | Kato | ............................. | 710/109 |

FOREIGN PATENT DOCUMENTS

| | | |
|---|---|---|
| JP | 3496501 | 11/2003 |
| JP | 2005-142872 | 6/2005 |

* cited by examiner

*Primary Examiner* — Glenn A Auve
(74) *Attorney, Agent, or Firm* — Radar, Fishman & Grauer PLLC

(57) ABSTRACT

Disclosed herein is a communication centralized control system including one master device; a communication bus; and a plurality of slave devices configured to be connected to the master device by the communication bus, wherein the master device and the plurality of slave devices are capable of bidirectional communication via the communication bus, and different channels are allocated to at least polling communication from the master device to the slave devices and interrupt communication from the slave devices to the master device, and communication is carried out with multiplexing on the same line.

18 Claims, 19 Drawing Sheets

CENTRALIZED MASTER-SLAVE-COMMUNICATION CONTROL SYSTEM AND METHOD WITH MULTI-CHANNEL COMMUNICATION ON THE SAME LINE

BACKGROUND OF THE INVENTION

1. Field of the Invention

The present invention relates to a centralized control system that carries out centralized control of a system having a large number of sensors and actuators, such as a printer and a copy machine, and particularly to a communication centralized control system and a communication centralized control method for control of communication between one master device and plural slave devices via a bus.

2. Description of the Related Art

FIG. 1 is a diagram showing the basic configuration of a bus network system in which bidirectional communication is carried out between a single master device and plural slaves.

In this bus network system 1, one master device 2 and plural slave devices 3-1 to 3-X are connected by a communication bus 4.

Bidirectional communication is carried out between the master device 2 and the plural slave devices 3-1 to 3-X via the communication bus 4.

In some cases, in the bus network system 1, the number of lines of the communication network is small and transmission/reception data are communicated by serial transmission.

In such a system, as shown in FIG. 2, the master device 2 carries out operation called polling, in which the master device 2 performs data exchange with the respective slave devices 3-1 to 3-X in turn.

In such polling operation, one of the slave devices 3-1 to 3-X often carries out interrupt operation of performing emergency data exchange.

In the case of executing such interrupt processing, as shown in FIG. 3, normal polling communication is temporarily stopped and interrupt communication is carried out.

Serial data transmission processing techniques are disclosed in Japanese Patent Laid-open No. 2005-142872 and Japanese Patent No. 3496501.

SUMMARY OF THE INVENTION

However, as described above, in the case of executing interrupt processing, normal polling communication is temporarily stopped and interrupt communication is carried out. This extends the time until the polling communication with all the slave devices is completed (polling cycle time).

The possibility of occurrence of this interrupt is higher when the number of slave devices is larger.

As a result, the completion of collection of information of all slaves is later. Thus, a problem occurs in a network system in which pieces of network information need to be collected within a limited time although plural slaves exist, such as a monitoring network and an FA network.

Therefore, the polling cycle time and the interrupt time are in a contradictory relationship.

As a countermeasure thereagainst, a scheme of increasing the communication speed in the network is generally known. However, this scheme involves a disadvantage that processing for a stubpath, termination processing, and so forth are necessary and thus restrictions on the construction of the network increase.

There is a need for the present invention to provide a communication centralized control system and a communication centralized control method that can carry out polling communication without suffering from the influence of interrupt communication and can keep the polling cycle time constant.

According to a first mode of the present invention, there is provided a communication centralized control system including one master device, a communication bus, and a plurality of slave devices configured to be connected to the master device by the communication bus. The master device and the plurality of slave devices are capable of bidirectional communication via the communication bus. Different channels are allocated to at least polling communication from the master device to the slave devices and interrupt communication from the slave devices to the master device, and communication is carried out with multiplexing on the same line.

According to a second mode of the present invention, there is provided a communication centralized control method including the steps of connecting one master device and a plurality of slave devices in such a way that the master device and the plurality of slave devices are capable of bidirectional communication by a communication bus, and allocating different channels to at least polling communication from the master device to the slave devices and interrupt communication from the slave devices to the master device, and carrying out communication with multiplexing on the same line.

According to the modes of the present invention, polling communication can be carried out without suffering from the influence of interrupt communication, and the polling cycle time can be kept constant.

DETAILED DESCRIPTION OF THE PREFERRED EMBODIMENT

An embodiment of the present invention will be described below in association with the drawings.

The order of the description is as follows.
1. Overall Outline of Communication Centralized Control System
2. Configuration Example of Multiplex Communication Systems of Master Device and Slave Device
3. Specific Configuration Examples of Master Device and Slave Device <1. Overall Outline of Communication Centralized Control System>

Figure 1:
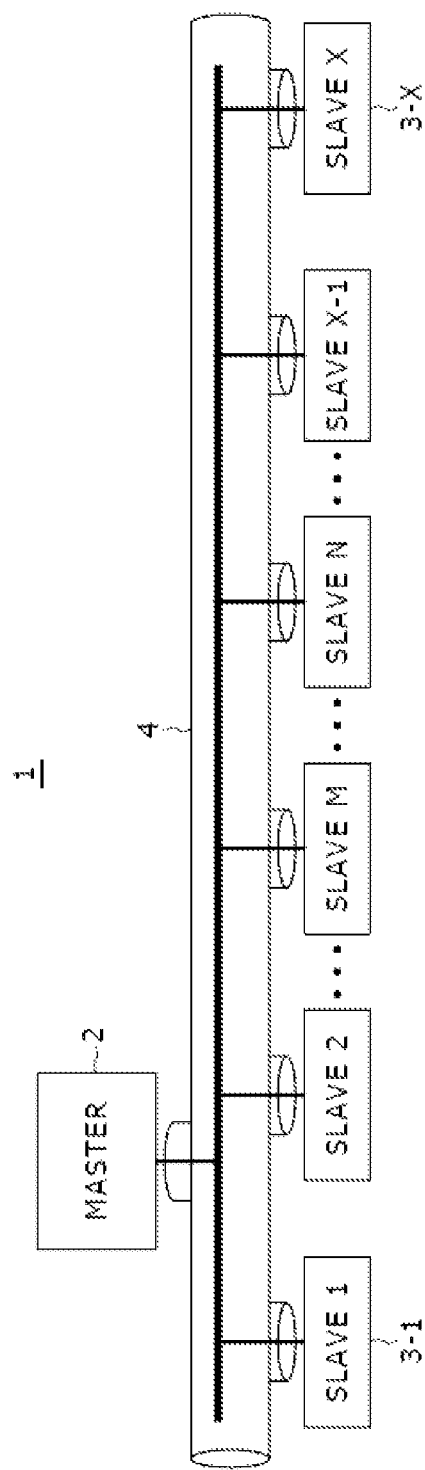
FIG. 1 is a diagram showing the basic configuration of a bus network system in which bidirectional communication is carried out between a single master device and plural slaves.
Figure 2:
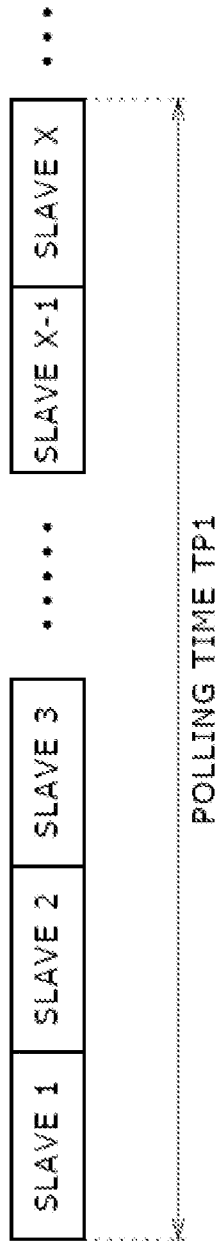
FIG. 2 is a diagram for explaining polling communication.
Figure 3:
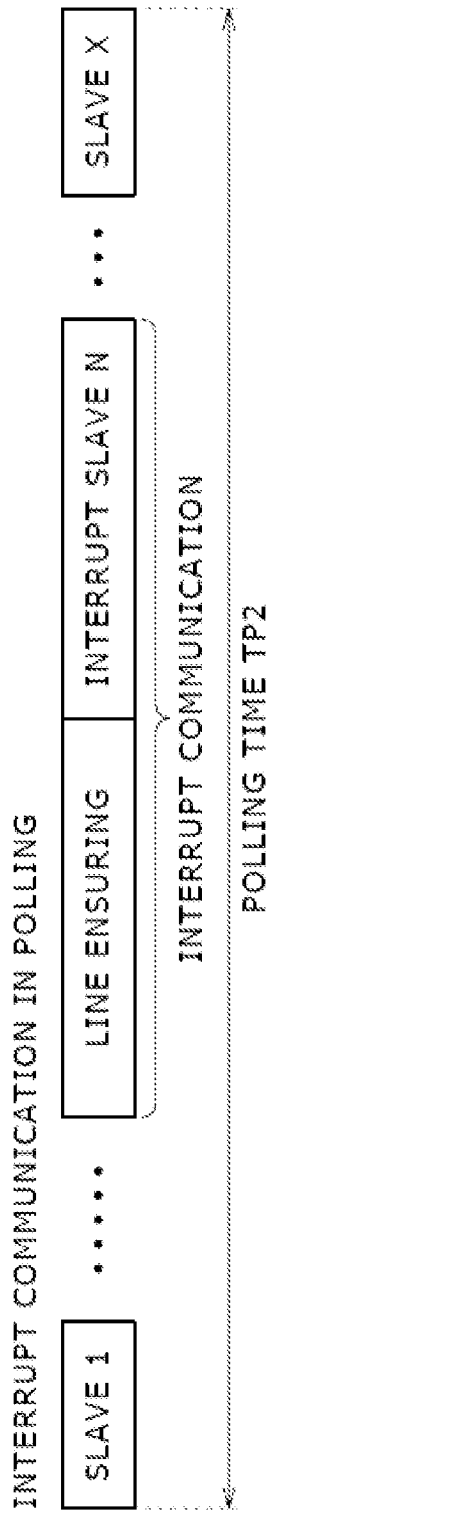
FIG. 3 is a diagram for explaining the communication state when interrupt has occurred in polling communication.
Figure 4:
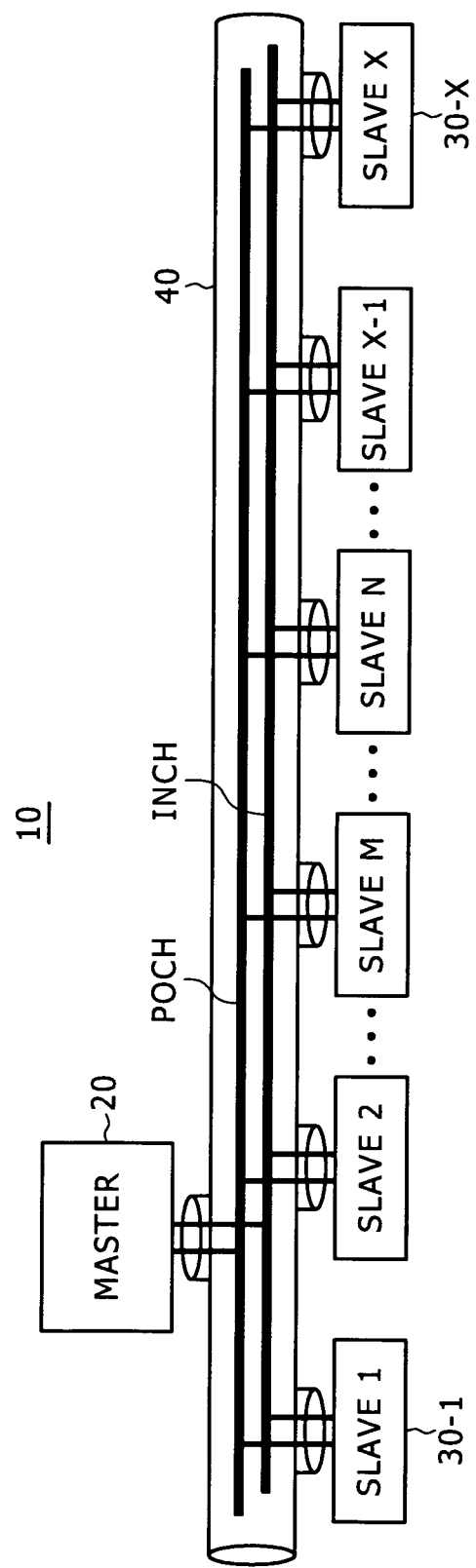
FIG. 4 is a diagram showing a configuration example of a communication centralized control system according to an embodiment of the present invention.

FIG. 4 is a diagram showing a configuration example of a communication centralized control system according to the embodiment of the present invention.

Figure 5:
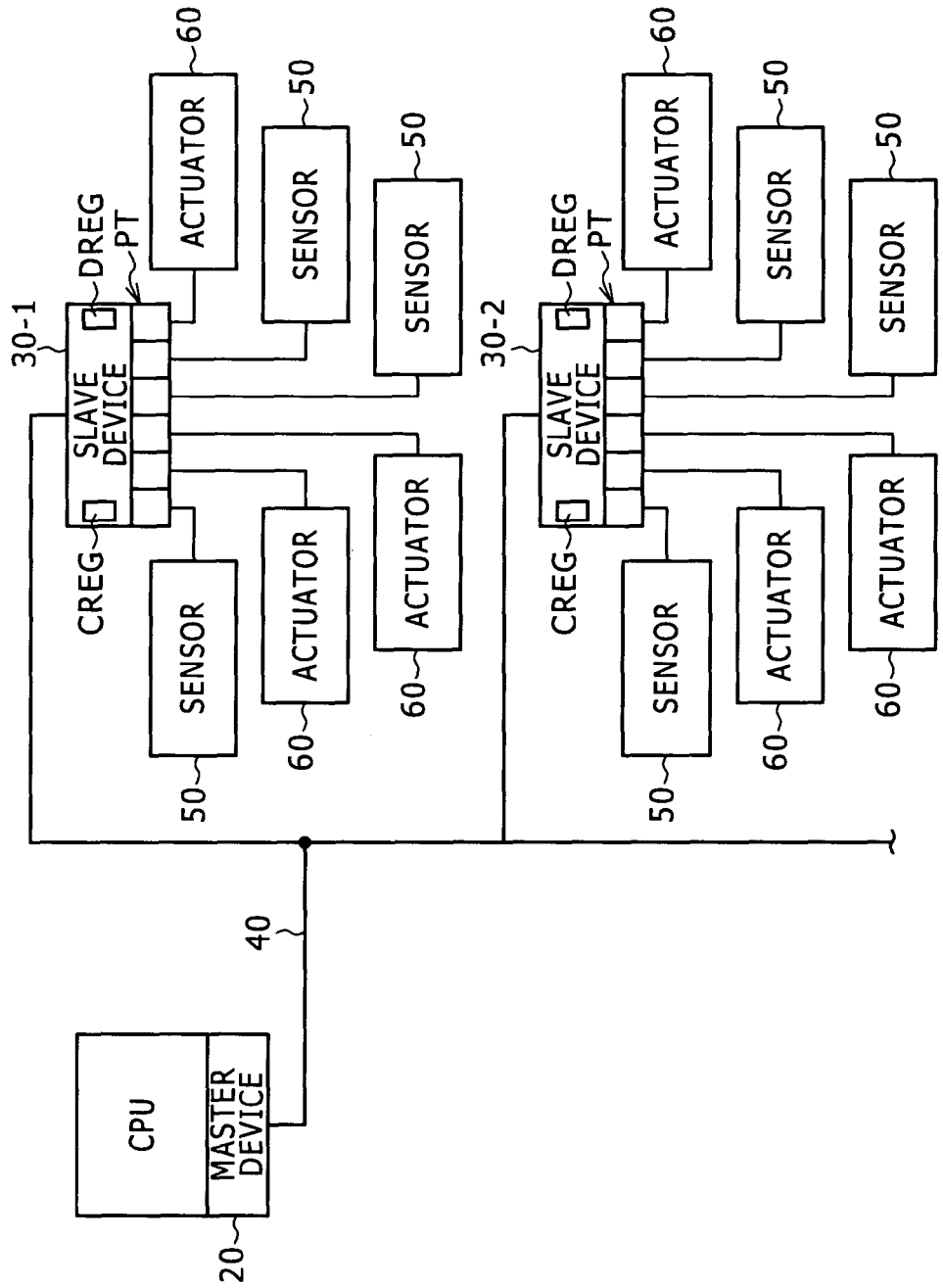
FIG. 5 is a diagram showing a connection form example of the slave device side of the communication centralized control system according to the embodiment of the present invention.

FIG. 5 is a diagram showing a connection form example of the slave device side of the communication centralized control system according to the embodiment of the present invention.

This communication centralized control system 10 includes one master device 20, plural slave devices 30-1 to 30-X, and a communication bus 40.

The master device 20 and the plural slave devices 30-1 to 30-X are connected by the communication bus 40.

The master device 20 and the plural slave devices 30-1 to 30-X are capable of bidirectional communication via e.g. the communication bus 40 in synchronization with e.g. a frame synchronizing signal CLK transmitted by the master device 20.

In this communication centralized control system 10, different channels are allocated to polling communication from the master device 20 to the respective slave devices 30-1 to 30-X and interrupt communication from the respective slave devices 30-1 to 30-X to the master device 20, and communication is carried out with multiplexing on the same line.

This allows the communication centralized control system 10 to prevent the polling communication from suffering from the influence of the interrupt communication and carry out the interrupt communication from the slave without changing the time of polling to the entire network.

Specifically, in this communication centralized control system 10, the master device 20 and the slave devices 30-1 to 30-X have a communication multiplexing function, and this communication centralized control system 10 is formed as a system in which multiplex communication by a polling channel POCH and an interrupt channel INCH is carried out on the same line of the communication bus 40.

Figure 6:
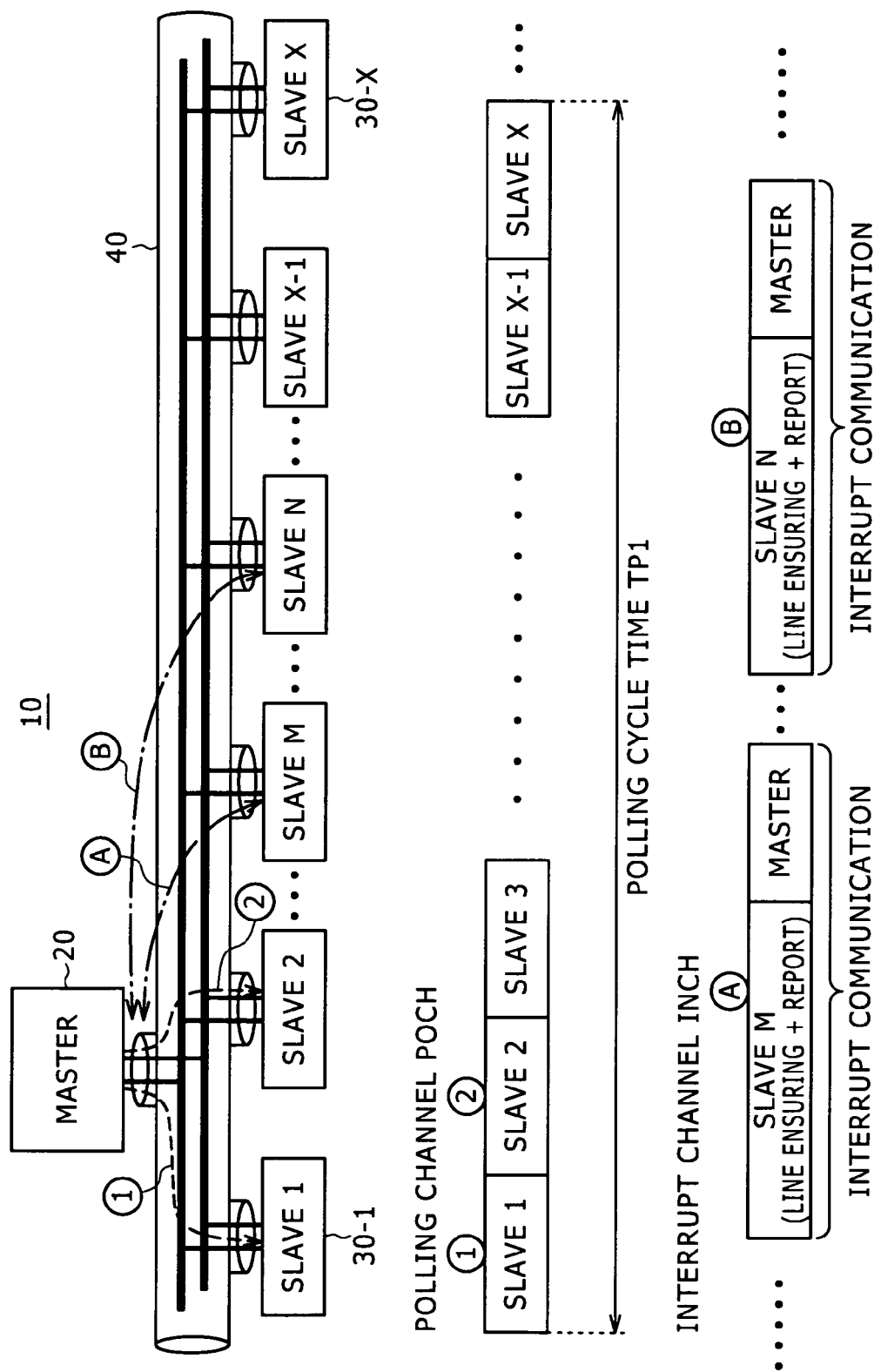
FIG. 6 is a diagram schematically showing polling operation and interrupt operation in the communication centralized control system according to the embodiment.

FIG. 6 is a diagram schematically showing the polling operation and the interrupt operation in the communication centralized control system according to the present embodiment.

In this communication centralized control system 10, as shown in FIG. 6, the master device 20 checks the respective slave devices 30-1 (Slave1) to 30-X (SlaveX) in that order by the polling channel POCH.

Furthermore, in this polling communication, the master device 20 communicates with e.g. the slave devices 30-M (SlaveM) and 30-N (SlaveN) by the interrupt channel INCH without changing a polling cycle time TP1 of the communication.

In the present embodiment, the master device 20 has a function to write the attributes of ports PT to the respective slave devices 30-1 to 30-X and a function to write actuator driving data to the slave device 30.

Furthermore, the master device 20 has a function to read out sensor data from the respective slave devices 30 and a function to detect an interrupt request from the respective slave devices 30.

In the respective slave devices 30, the attributes of each port are determined by the value written to a configuration register CREG from the master device 20.

Examples of the attributes include whether the port is a sensor port or an actuator port, the threshold of the sensor signal, and the driving input amplitude of the actuator.

When the port PT for which the sensor attributes are set is accessed in the slave device 30, the slave device 30 returns the read value to the communication bus 40.

When the port PT for which the actuator attributes are set is accessed in the slave device 30, a value is written to a data register DREG.

The value written to the data register DREG is immediately reflected in an actuator 60, and this reflection continues until the data register DREG is rewritten.

This is the end of the description about the overall outline of the communication centralized control system according to the present embodiment.

In the following, the specific configurations and functions of the master device 20 and the slave devices 30 (-1 to -X) that form the communication centralized control system according to the present embodiment will be described.

<2. Configuration Example of Multiplex Communication Systems of Master Device and Slave Device>

Figure 7:
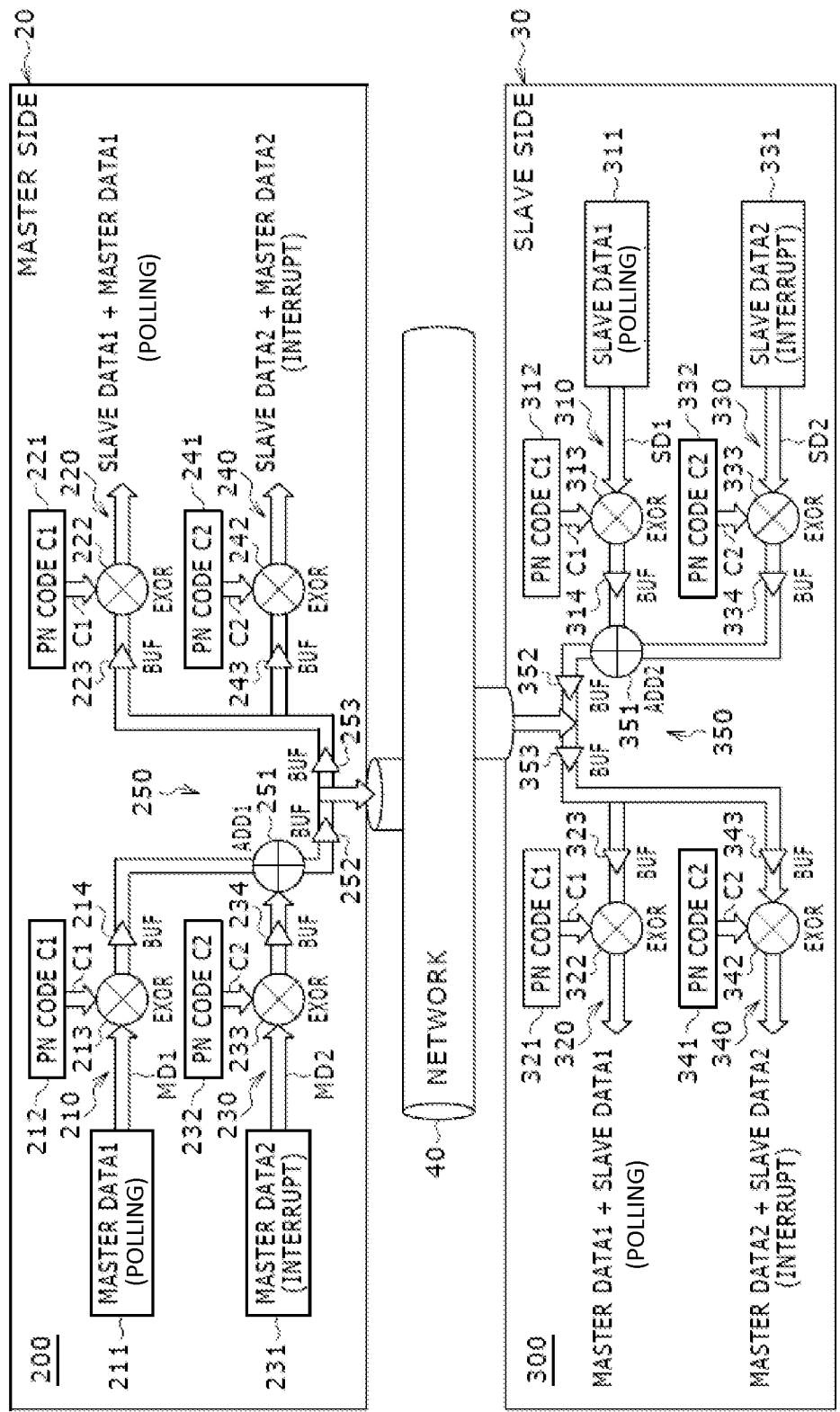
FIG. 7 is a diagram showing a configuration example of the major parts of multiplex communication systems of a master device and a slave device according to the embodiment.

FIG. 7 is a diagram showing a configuration example of the major parts of the multiplex communication systems of the master device and the slave device according to the present embodiment.

Multiplex communication systems 200 and 300 of the master device 20 and the slave device 30 in FIG. 7 employ synchronous orthogonal code modulation as a multiplexing system, and use the PN (pseudo-noise) code, which is an orthogonal code.

The multiplex communication systems 200 and 300 use a PN code C1 for polling communication in the master device 20 and all the slave devices 30.

The multiplex communication systems 200 and 300 have a configuration in which each of the master device 20 and all the slave devices 30 has a transmitter and a receiver for polling communication.

The multiplex communication system 200 of the master device 20 has a transmitter 210 and a receiver 220 for polling communication.

The multiplex communication system 300 of each slave device 30 has a transmitter 310 and a receiver 320 for polling communication.

The multiplex communication systems 200 and 300 use a PN code C2 for interrupt communication in the master device 20 and all the slave devices 30.

The multiplex communication systems 200 and 300 have a configuration in which each of the master device 20 and all the slave devices 30 has a transmitter and a receiver for interrupt communication.

The multiplex communication system 200 of the master device 20 has a transmitter 230 and a receiver 240 for interrupt communication.

The multiplex communication system 300 of each slave device 30 has a transmitter 330 and a receiver 340 for interrupt communication.

The multiplex communication system 200 of the master device 20 has a transmitter/receiver 250 in addition to the transmitter 210 and the receiver 220 for polling communication and the transmitter 230 and the receiver 240 for interrupt communication.

The multiplex communication system 300 of the slave device 30 has a transmitter/receiver 350 in addition to the transmitter 310 and the receiver 320 for polling communication and the transmitter 330 and the receiver 340 for interrupt communication.

The transmitter 210 for polling communication in the master device 20 has a polling master data generator 211 that generates polling master data MD1 and a PN code generator 212 that generates the PN code C1.

The transmitter 210 has an exclusive OR gate (EXOR) 213 that takes the exclusive OR of the PN code C1 and the polling master data MD1 to carry out code modulation, and a buffer (BUF) 214 disposed at the output stage of the EXOR 213.

The receiver 220 for polling communication has a PN code generator 221 that generates the PN code C1 and an exclusive OR gate (EXOR) 222 that performs inverse transform of the data obtained by addition of the polling slave data SD1 and master data MD1 and interrupt slave data SD2 and master data MD2 that are code-modulated. The receiver 220 has a buffer (BUF) 223 disposed at the input stage of the EXOR 222. The "inverse transform" means demodulation.

The transmitter 230 for interrupt communication in the master device 20 has an interrupt master data generator 231 that generates the interrupt master data MD2 and a PN code generator 232 that generates a PN code C2.

The transmitter 230 has an exclusive OR gate (EXOR) 233 that takes the exclusive OR of the PN code C2 and the interrupt master data MD2 to carry out code modulation, and a buffer (BUF) 234 disposed at the output stage of the EXOR 233.

The receiver 240 for interrupt communication has a PN code generator 241 that generates the PN code C2 and an exclusive OR gate (EXOR) 242 that performs inverse transform of the data obtained by addition of the polling slave data SD1 and master data MD1 and the interrupt slave data SD2 and master data MD2 that are code-modulated. The receiver 240 has a buffer (BUF) 243 disposed at the input stage of the EXOR 242.

The transmitter/receiver 250 in the master device 20 has an adder (ADD1) 251 and buffers (BUF) 252 and 253.

The adder 251 adds (superimposes) the polling master data MD1 that is code-modulated by the EXOR 213 of the transmitter 210 and has passed through the buffer 214 and the interrupt master data MD2 that is code-modulated by the EXOR 233 of the transmitter 230 and has passed through the buffer 234.

The buffer 252 buffers the code-modulated master data MD1+MD2 resulting from the addition by the adder 251 and transfers the data to the communication bus 40. The buffer 253 buffers the master data MD1+MD2 added, on the bus, to the code-modulated slave data SD1+SD2 transferred through the communication bus 40, and supplies the data to the receivers 220 and 240.

In the master device 20, the PN code generators 212 and 221 for generating the PN code C1 can be replaced by a single common PN code generator, and the PN code generators 232 and 241 for generating the PN code C2 can be replaced by a single common PN code generator.

Alternatively, it is also possible to replace all the PN code generators 212, 221, 232, and 241 by a single common PN code generator.

The transmitter 310 for polling communication in the slave device 30 has a polling slave data generator 311 that generates the polling slave data SD1 and a PN code generator 312 that generates the PN code C1.

The transmitter 310 has an exclusive OR gate (EXOR) 313 that takes the exclusive OR of the PN code C1 and the polling slave data SD1 to carry out code modulation, and a buffer (BUF) 314 disposed at the output stage of the EXOR 313.

The receiver 320 for polling communication has a PN code generator 321 that generates the PN code C1 and an exclusive OR gate (EXOR) 322 that takes the exclusive OR of the polling master data MD1 and slave data SD1 to perform inverse transform of code-modulated data. The receiver 320 has a buffer (BUF) 323 disposed at the input stage of the EXOR 322.

The transmitter 330 for interrupt communication in the slave device 30 has an interrupt slave data generator 331 that generates the interrupt slave data SD2 and a PN code generator 332 that generates the PN code C2.

The transmitter 330 has an exclusive OR gate (EXOR) 333 that takes the exclusive OR of the PN code C2 and the interrupt slave data SD2 to carry out code modulation, and a buffer (BUF) 334 disposed at the output stage of the EXOR 333.

The receiver 340 for interrupt communication has a PN code generator 341 that generates the PN code C2 and an exclusive OR gate (EXOR) 342 that performs inverse transform of the data obtained by addition of the interrupt master data MD2 and slave data SD2 and the polling slave data SD1 and master data MD1. The receiver 340 has a buffer (BUF) 343 disposed at the input stage of the EXOR 342.

The transmitter/receiver 350 in the slave device 30 has an adder (ADD2) 351 and buffers (BUF) 352 and 353.

The adder 351 adds (superimposes) the polling slave data SD1 that is code-modulated by the EXOR 313 of the transmitter 310 and has passed through the buffer 314 and the interrupt slave data SD2 that is code-modulated by the EXOR 333 of the transmitter 330 and has passed through the buffer 334.

The buffer 352 buffers the code-modulated slave data SD1+SD2 resulting from the addition by the adder 351 and transfers the data to the communication bus 40.

The buffer 353 buffers the slave data SD1+SD2 added, on the bus, to the code-modulated master data MD1+MD2 transferred through the communication bus 40, and supplies the data to the receivers 320 and 340.

In the slave device 30, the PN code generators 312 and 321 for generating the PN code C1 can be replaced by a single common PN code generator, and the PN code generators 332 and 341 for generating the PN code C2 can be replaced by a single common PN code generator.

Alternatively, it is also possible to replace all the PN code generators 312, 321, 332, and 341 by a single common PN code generator.

Figure 8:
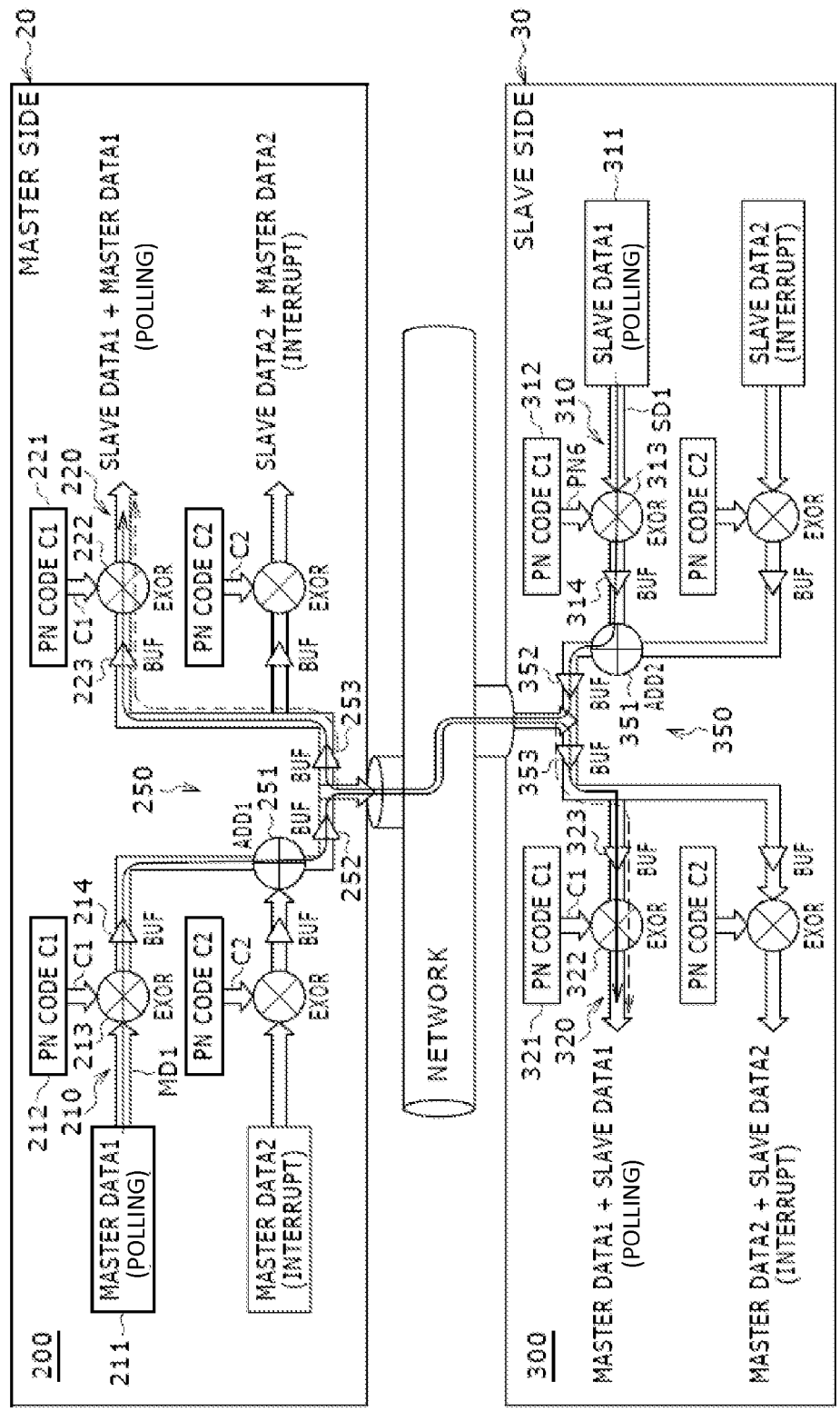
FIG. 8 is a diagram showing the path of polling communication by the multiplex communication systems of the master device and the slave device according to the embodiment.

FIG. 8 is a diagram showing the path of polling communication by the multiplex communication systems of the master device and the slave device according to the present embodiment.

Figure 9:
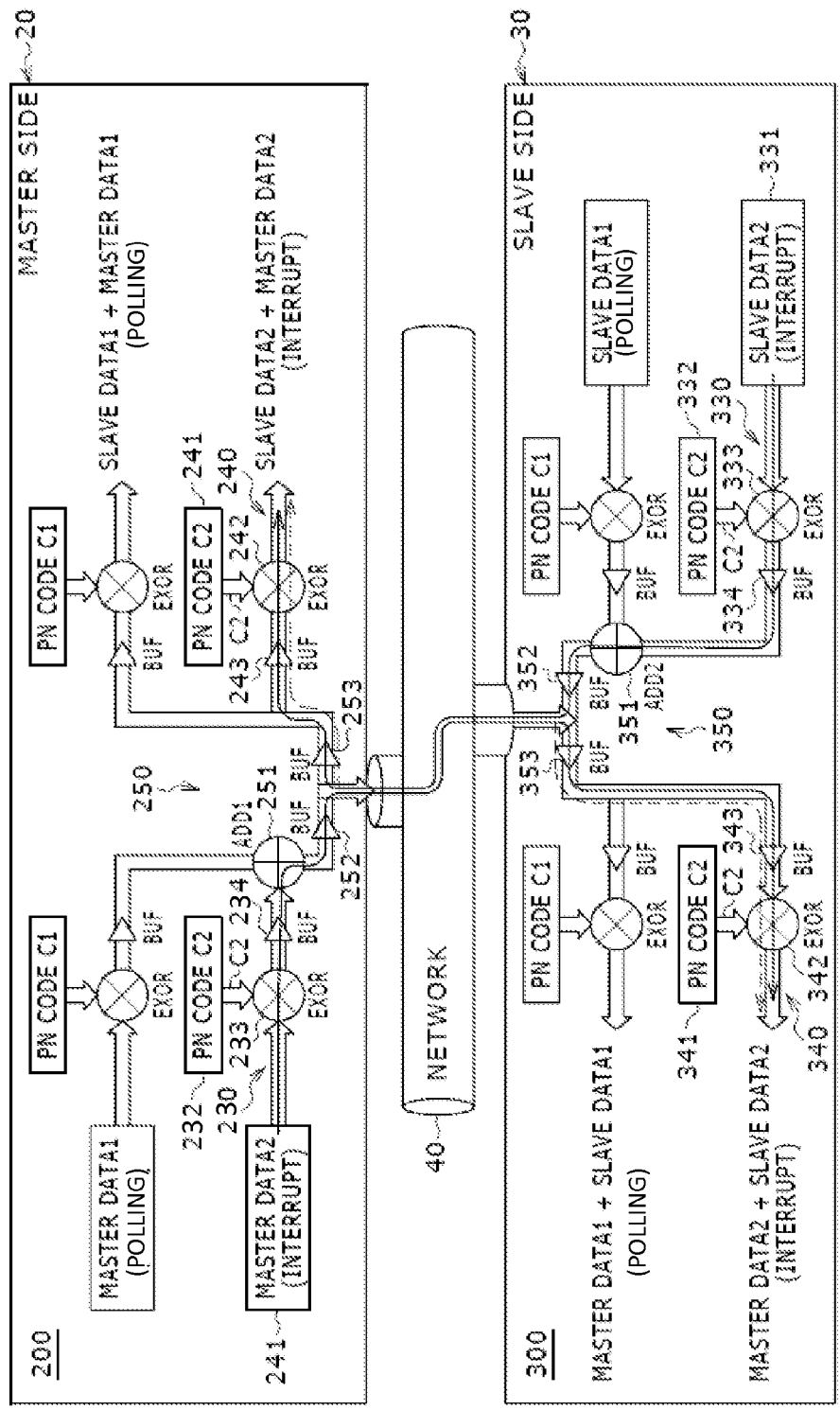
FIG. 9 is a diagram showing the path of interrupt communication by the multiplex communication systems of the master device and the slave device according to the embodiment.

FIG. 9 is a diagram showing the path of interrupt communication by the multiplex communication systems of the master device and the slave device according to the present embodiment.

In the transmitter 210 of the master device 20, the polling master data MD1 to be transmitted by the master device 20 is generated by the polling master data generator 211, and this polling master data MD1 is code-modulated with the PN code C1 by the EXOR 213.

Furthermore, in the transmitter 230 of the master device 20, the interrupt master data MD2 to be transmitted by the master device 20 is generated by the interrupt data generator 231, and this interrupt master data MD2 is code-modulated with the PN code C2 by the EXOR 233.

These code-modulated polling master data MD1 and interrupt master data MD2 are added by the adder 251 of the transmitter/receiver 250 and output to the communication bus 40 by the buffer 252.

Similarly, also in all the slave devices 30, the polling slave data SD1 to be transmitted by the slave device 30 is generated by the polling slave data generator 311 of the transmitter 310. In each transmitter 310, the polling slave data SD1 is code-modulated with the PN code C1 by the EXOR 313.

The interrupt slave data SD2 to be transmitted by the slave device 30 is generated by the interrupt slave data generator 331 of the transmitter 330, and this interrupt slave data SD2 is code-modulated with the PN code. C2 by the EXOR 333.

These code-modulated polling slave data SD1 and interrupt slave data SD2 are added by the adder 351 of the transmitter/receiver 350 and output to the communication bus 40 by the buffer 352.

The signals transferred to the communication bus 40 become a signal resulting from addition on the communication bus 40, and communication is carried out by this signal.

The signal obtained by the addition of the outputs of the master device 20 and all the slave devices 30 is received by the transmitter/receiver 250 of the master device 20 and the transmitter/receiver 350 of each slave device 30.

In the master device 20, the received signal is inversely transformed with the PN code C1 by the EXOR 222 of the receiver 220, so that the polling slave data SD1 is extracted and sent to a subsequent-stage processing system.

Furthermore, in the master device 20, the received signal is inversely transformed with the PN code C2 by the EXOR 242 of the receiver 240, so that the interrupt slave data SD2 is extracted and sent to the subsequent-stage processing system.

In each slave device 30, the received signal is inversely transformed with the PN code C1 by the EXOR 322 of the receiver 320, so that the polling master data MD1 is extracted and sent to a subsequent-stage processing system.

Furthermore, in each slave device 30, the received signal is inversely transformed with the PN code C2 by the EXOR 342 of the receiver 340, so that the interrupt master data MD2 is extracted and sent to the subsequent-stage processing system. Each subsequent-stage processing system executes processing in accordance with the communication flow.

<3. Specific Configuration Examples of Master Device and Slave Device>

Figure 10:
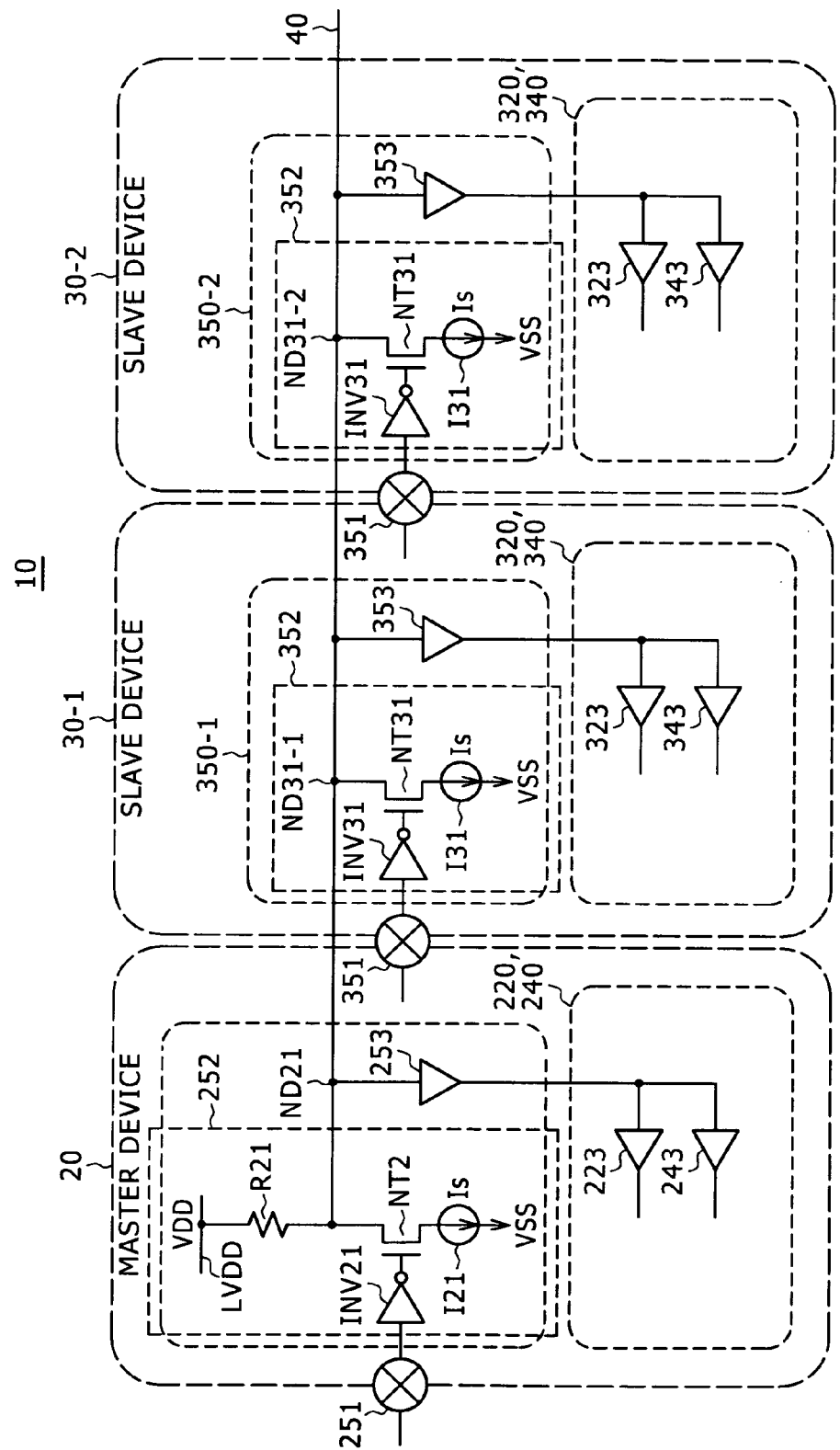
FIG. 10 is a diagram showing a specific configuration example of the major parts of transmitters/receivers in the communication centralized control system according to the embodiment.

FIG. 10 is a diagram showing a specific configuration example of the major parts of the transmitters/receivers in the communication centralized control system according to the present embodiment.

In FIG. 10, a case in which two slave devices 30-1 and 30-2 are connected to one master device 20 by the communication bus 40 is shown as an example, for diagram simplification and understanding facilitation.

[Configuration Example of Master Device]

Figure 11:
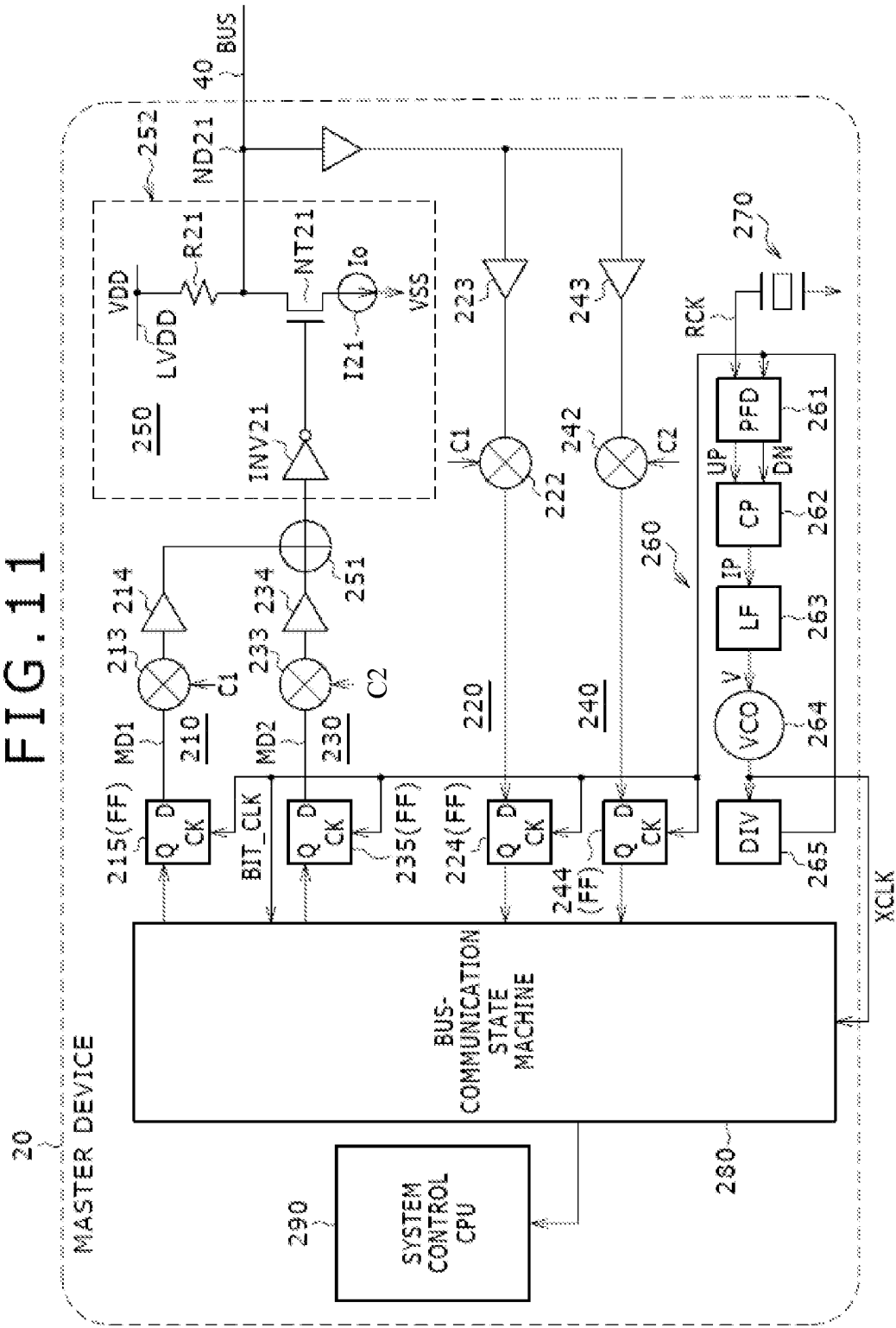
FIG. 11 is a diagram showing a specific configuration example of the master device according to the embodiment.

FIG. 11 is a diagram showing a specific configuration example of the master device according to the present embodiment.

In the master device 20, in addition to the configuration of FIG. 7, the transmitter 210 has a latch (FF) 215, the transmitter 230 has a latch (FF) 235, the receiver 220 has a latch (FF) 224, and the receiver 240 has a latch (FF) 244.

Furthermore, in addition to the configuration of FIG. 7, the transmitter/receiver 250 has an n-channel MOS (NMOS) transistor NT21, a current source I21, an inverter INV21, and a resistance element R21 of resistance R as an output circuit 252.

In addition, the master device 20 has a PLL circuit 260, a quartz oscillator 270, a bus-communication state machine 280, and a system control CPU 290.

The bus-communication state machine 280 and the system control CPU 290 are so configured as to include the functions of the polling master data generator 211, the interrupt master data generator 231, and the subsequent-stage processing system.

In the output circuit 252, the source of the NMOS transistor NT21 is connected to the current source I21 to supply a current Io. The drain thereof is connected to a connecting node ND21. The gate thereof is connected to the code-modulated data supply line of the EXOR 251 via the inverter INV21.

The current source I21 to supply the current. Io is connected to a reference potential VSS (e.g. ground GND).

One end of the resistance element R21 is connected to a supply line LVDD of a supply voltage VDD, and the other end thereof is connected to the connecting node ND21.

The PLL circuit 260 generates a bit clock BIT_CLK that is phase-locked with a reference clock RCK by the quartz oscillator 270, and supplies the generated clock BIT_CLK to the latches 215, 235, 224, and 244.

The PLL circuit 260 has a phase comparator 261, a charge pump (CP) 262, a loop filter (LF) 263, a voltage-controlled oscillator (VCO) 264, and a frequency divider (DIV) 265, which form a PLL (phase-locked loop).

This PLL circuit 260 carries out such locking control that the phase of an output clock XCLK of the frequency divider 265 is locked with the phase of the reference clock RCK.

The PLL circuit 260 supplies the generated bit clock BIT_CLK and system clock XCLK to the bus-communication state machine 280.

The latches 215, 235, 224, and 244 are formed of e.g. a D flip-flop FF.

The latch 215 synchronizes with the bit clock BIT_CLK to latch bit data supplied by the bus-communication state machine 280 and supply the latched data as the polling master data MD1 to the EXOR 213 of the transmitter 210.

The latch 235 synchronizes with the bit clock BIT_CLK to latch bit data supplied by the bus-communication state machine 280 and supply the latched data as the interrupt master data MD2 to the EXOR 233 of the transmitter 230.

The latch 224 synchronizes with the bit clock BIT_CLK to latch the polling slave data SD1 and the polling master data MD1 that are received by the receiver 220 and inversely transformed by the EXOR 222 and supply the data to the bus-communication state machine 280.

The latch 244 synchronizes with the bit clock BIT_CLK to latch the interrupt slave data SD2 and the interrupt master data MD2 that are received by the receiver 240 and inversely transformed by the EXOR 242 and supply the data to the bus-communication state machine 280.

Under control by the system control CPU 290, the bus-communication state machine 280 is supplied with the bit clock BIT_CLK and the system clock XCLK from the PLL circuit 260, and executes bus-communication state processing in synchronization with these clocks.

The bus-communication state machine 280 supplies data as bit data to the latches 215 and 235.

The bus-communication state machine 280 receives reception data and so forth supplied via the latches 224 and 244, and executes processing of readout data, processing for interrupt, and so forth.

The system control CPU 290 controls the whole of the communication centralized control system 10 and controls the bus-communication state processing of the bus-communication state machine 280, such as bus scheduling.

The system control CPU 290 controls the bus-communication state machine 280 so that the bus-communication state machine 280 may carry out polling for the plural slave devices 30 (-1 to -X).

[Configuration Example of Slave Device]

Figure 12:
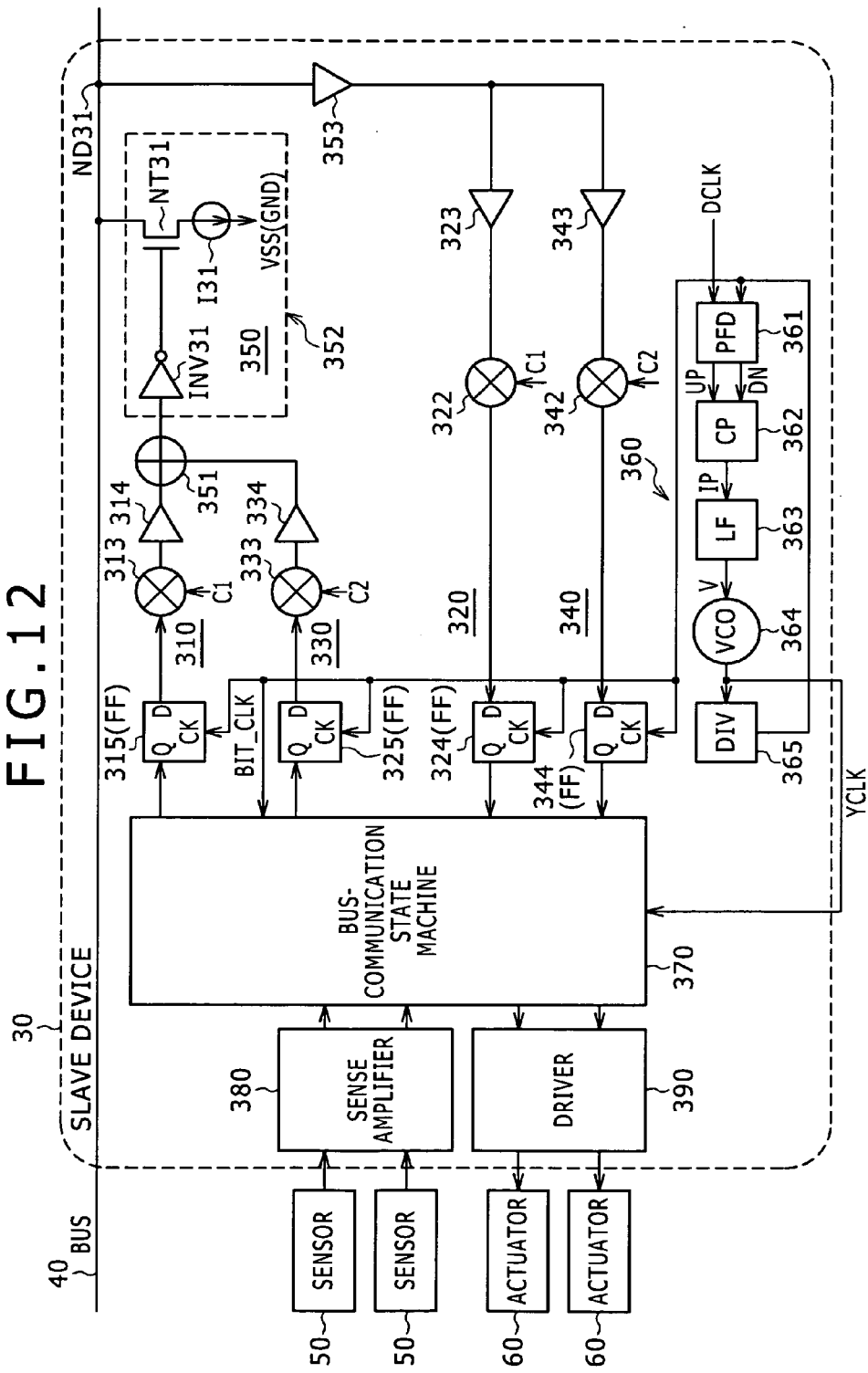
FIG. 12 is a diagram showing a specific configuration example of the slave device according to the embodiment.

FIG. 12 is a diagram showing a specific configuration example of the slave device according to the present embodiment.

In each slave device 30, in addition to the configuration of FIG. 7, the transmitter 310 has a latch (FF) 315, the transmitter 330 has a latch (FF) 325, the receiver 320 has a latch (FF) 324, and the receiver 340 has a latch (FF) 344.

Furthermore, in addition to the configuration of FIG. 7, the transmitter/receiver 350 has an NMOS transistor NT31, an inverter INV31, and a current source I31 as an output circuit 352.

The slave device 30 has a PLL circuit 360, a bus-communication state machine 370, a sense amplifier 380, and a driver 390.

The bus-communication state machine 370, the sense amplifier 380, and the driver 390 are so configured as to include the functions of the polling slave data generator 311, the interrupt slave data generator 331, and the subsequent-stage processing system.

In the output circuit 352, the source of the NMOS transistor NT31 is connected to the current source I31 to supply a current Is. The drain thereof is connected to a connecting node ND31. The gate thereof is connected to the supply line for code-modulated data by the EXOR 351 of the transmitter/receiver 350 via the inverter INV31.

The current source I31 to supply the current Is is connected to the reference potential VSS (e.g. ground GND).

The PLL circuit 360 generates a bit clock BIT_CLK that is phase-locked with a detected or generated clock DCLK, and supplies the generated clock BIT_CLK to the latches 315, 325, 324, and 344.

The PLL circuit 360 has a phase comparator 361, a charge pump (CP) 362, a loop filter (LF) 363, a voltage-controlled oscillator (VCO) 364, and a frequency divider (DIV) 365, which form a PLL (phase-locked loop).

This PLL circuit 360 carries out such locking control that the phase of an output clock of the frequency divider 365 is locked with the phase of the clock DCLK.

The PLL circuit 360 supplies the generated bit clock BIT_CLK and system clock YCLK to the bus-communication state machine 370.

The latches 315, 325, 324, and 344 are formed of e.g. a D flip-flop FF.

The latch 315 synchronizes with the bit clock BIT_CLK to latch bit data supplied by the bus-communication state machine 370 and supply the latched data as the polling slave data SD1 to the EXOR 313.

The latch 325 synchronizes with the bit clock BIT_CLK to latch bit data supplied by the bus-communication state machine 370 and supply the latched data as the interrupt slave data SD2 to the EXOR 333.

The latch 324 synchronizes with the bit clock BIT_CLK to latch the polling master data MD1 and the polling slave data SD1 that are received by the receiver 320 and inversely transformed by the EXOR 322 and supply the data to the bus-communication state machine 370.

The latch 344 synchronizes with the bit clock BIT_CLK to latch the interrupt master data MD2 and the interrupt slave data SD2 that are received by the receiver 340 and inversely transformed by the EXOR 342 and supply the data to the bus-communication state machine 370.

The bus-communication state machine 370 is supplied with the bit clock BIT_CLK from the PLL circuit 360 and executes bus-communication state processing in synchronization with this clock.

The bus-communication state machine 370 reads out information on sensors 50 read out by the sense amplifier 380 and supplies the information as bit data to the latches 315 and 325.

The bus-communication state machine 370 receives detection data DATA_W supplied via the latches 324 and 344 and controls driving of the predetermined actuator 60 via the driver 390.

The bus-communication state machine 370 receives reception data and so forth supplied via the latches 324 and 344 and executes processing of readout data and writing data, processing for interrupt, and so forth.

In the present embodiment, one master device 20 and the plural slave devices 30-1 to 30-X are connected to the one-line communication bus 40 as described above.

Figure 13:
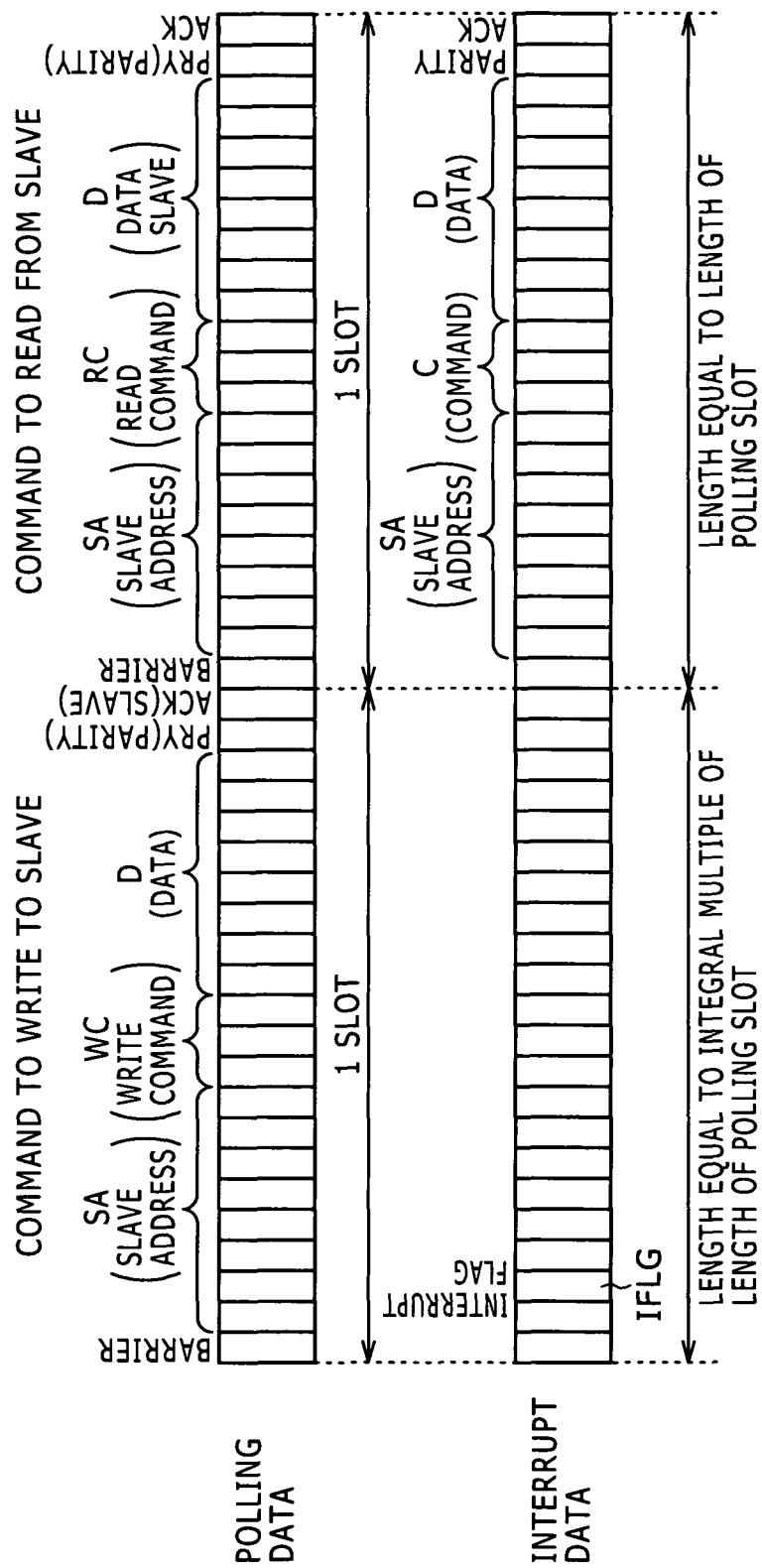
FIG. 13 is a diagram showing a configuration example of slot data of polling communication and interrupt communication.

FIG. 13 is a diagram showing a configuration example of slot data of polling communication and interrupt communication.

Figure 14:
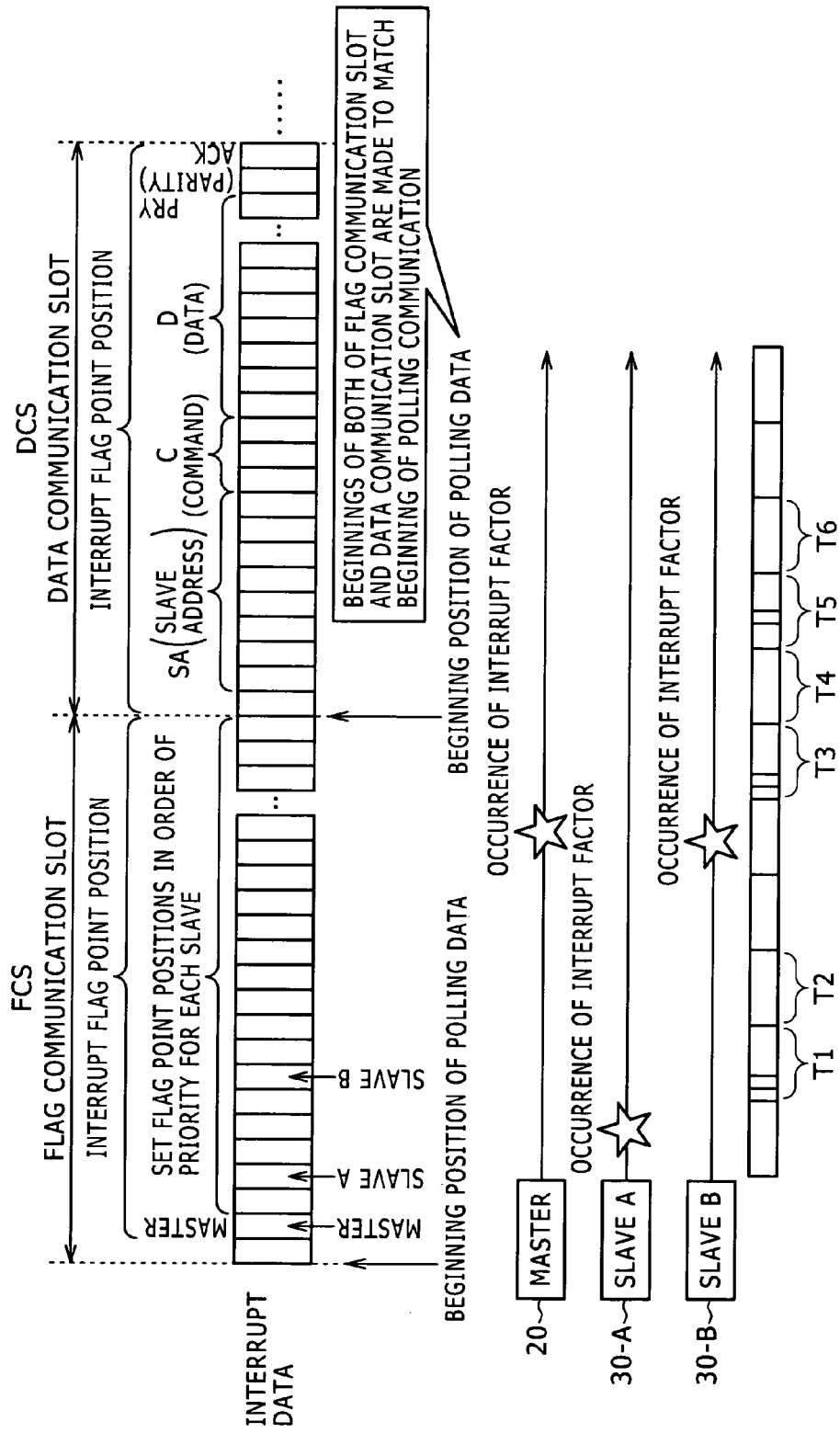
FIG. 14 is a diagram schematically showing specific processing in interrupt.

FIG. 14 is a diagram schematically showing specific processing in interrupt.

FIGS. 15 to 19 are flowcharts relating to communication control according to the present embodiment.

The details of the control flows of FIGS. 15 to 19 will be described later.

The data shown in FIG. 13 are data D1 and D2 that have yet to be code-modulated and will be treated by the respective subsequent stages.

For both of the polling data D1 (MD1, SD1) and the interrupt data D2 (MD2, SD2), data transmitted from the slave device 30 is so represented as to be given (Slave).

Both of the master device 20 and the slave device 30 transmit an interrupt flag IFLG.

In transmission of polling data from the master device 20 to the slave device 30, the master device 20 executes processing in accordance with the control flow of FIG. 16, whose details will be described later.

In this case, the master device 20 transmits data of "SA (Slave Address)"+"WC (write command)"+"D (Data)"+ "PRY (Parity)" to the slave device 30.

Upon receiving the data in accordance with the control flow of FIG. 17, whose details will be described later, the slave device 30 transmits an acknowledge ACK to the master device 20.

Figure 16:
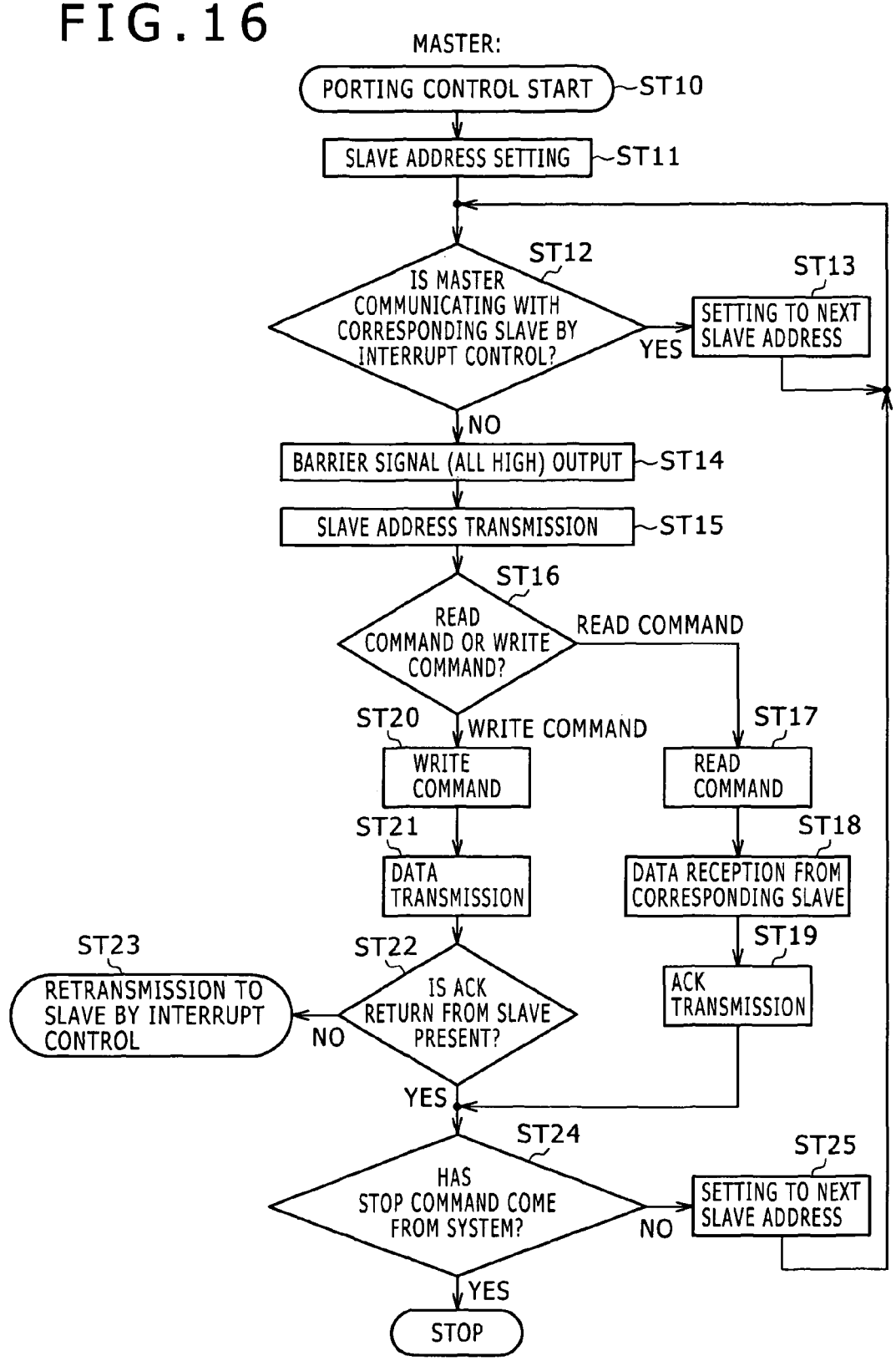
FIG. 16 is a flowchart for explaining the polling communication control operation of the master device according to the embodiment.

When the master device 20 makes the slave device 30 send data, the master device 20 transmits "SA Address)"+"RC (read command)" to the slave device 30 in accordance with the control flow of FIG. 16.

Figure 17:
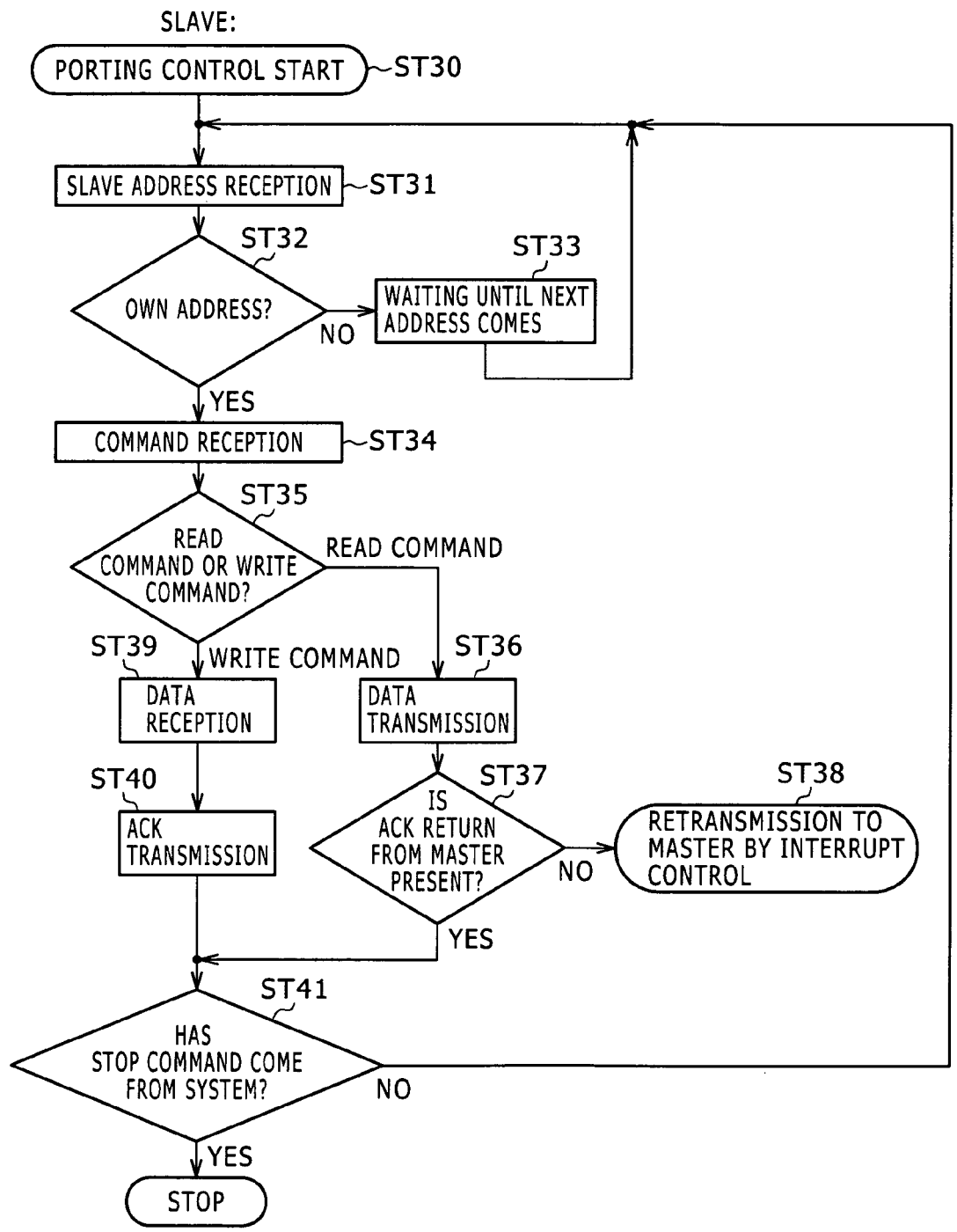
FIG. 17 is a flowchart for explaining the polling communication control operation of the slave device according to the embodiment.

The slave device 30 transmits data of "D (Data)"+"PRY (Parity)" to the master device 20 in accordance with the control flow of FIG. 17. Upon receiving the data in accordance with the control flow of FIG. 16, the master device 20 transmits the acknowledge ACK to the slave device 30.

Before sending interrupt data, the master device 20 and each slave device 30 set an interrupt flag at a preset position in the slot by which polling data is being sent.

When wanting to send a polling slot, the master device 20 itself or the slave device 30 itself confirms that the flag IFLG is absent in the polling slot to be sent, to prevent interrupt collision.

If the flag IFLG is present, after confirming the completion of sending of data by the master device 20 or the slave device 30 that has set this flag IFLG, the master device 20 or the slave device 30 sets the flag IFLG anew.

The device whose flag IFLG is at a more anterior position has priority.

The master device 20 or the slave device 30 starts to send interrupt data from the next slot if a flag other than the own flag is absent.

In the case of interrupt processing, for example as shown in FIG. 14, the interrupt flag point position is set in a flag communication slot FCS. The first-priority position is the position for the master device 20.

For the slave devices 30-A and 30-B, the flag point position is set in order of priority for each slave device.

In the example of FIG. 14, the priority of the slave device 30-A is set higher than that of the slave device 30-B.

In a data communication slot DCS, the above-described data of "SA (Slave Address)"+"C (command)"+"D (Data)"+ "PRY (Parity)" is set.

The beginnings of both of the flag communication slot FCS and the data communication slot DCS are made to match the beginning of polling communication. In matching with the number of slaves, the length of the flag communication slot FCS is set to an integral multiple of the length of the polling slot.

In FIG. 14, the frames of the interrupt channel INCH are as follows.

A period T1 indicates the frame period in which the slave device 30-A issues the interrupt flag IFLG.

A period T2 indicates the data communication period of the slave device 30-A.

A period T3 indicates the frame period in which an interrupt factor occurs in the master device 20 and the slave device 30-B simultaneously but the master device 20 has a more anterior flag position and thus the slave device 30-B detects the flag to stop flag issue.

A period T4 indicates the data communication period of the master device 20.

A period T5 indicates the period in which the communication due to the first flag issue is completed but polling communication of the slave device 30-B has yet to be finished and thus the slave device 30-B issues a flag.

A period T6 indicates the data communication period of the slave device 30-B.

Figure 18:
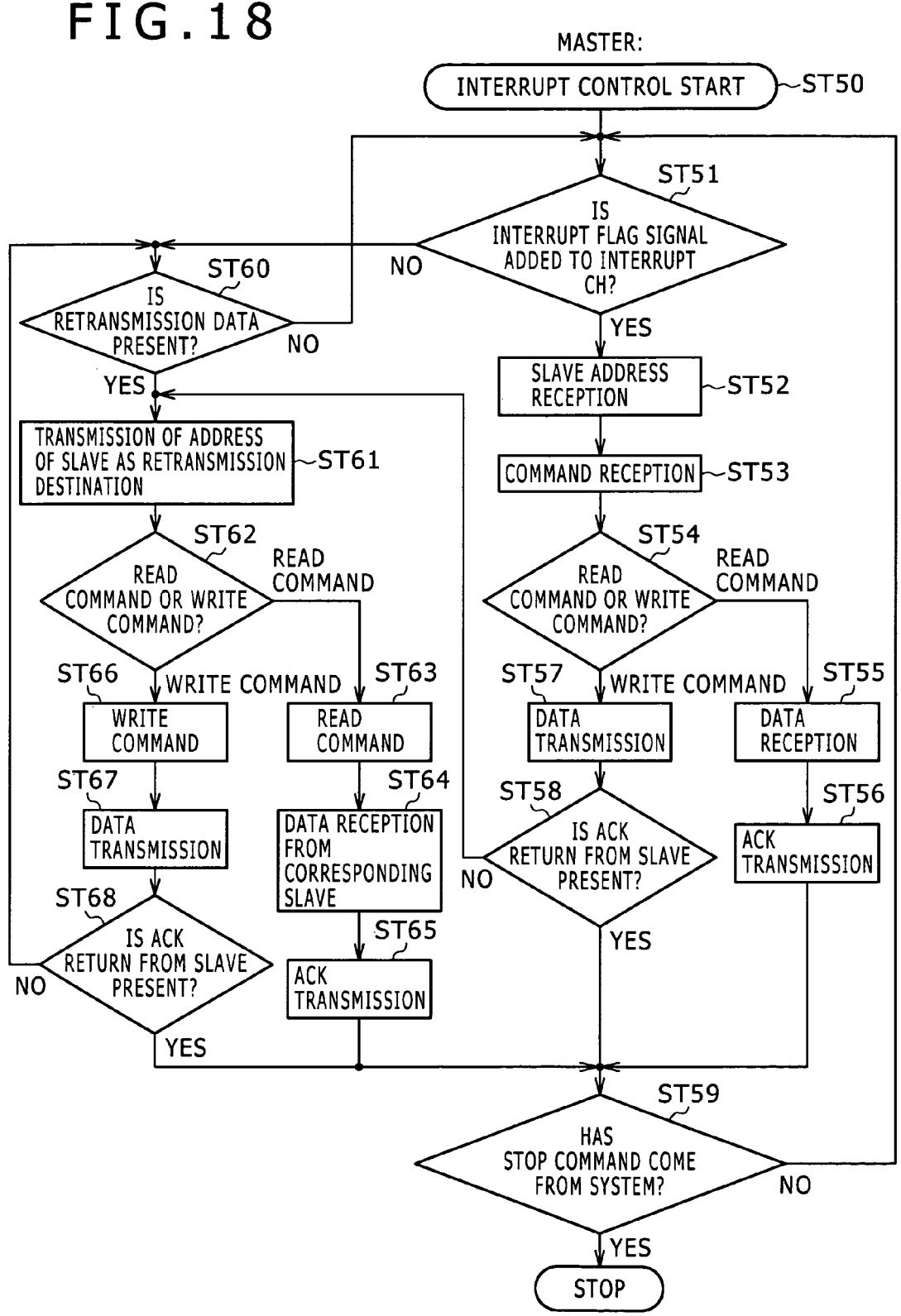
FIG. 18 is a flowchart for explaining the interrupt communication control operation of the master device according to the embodiment.
Figure 19:
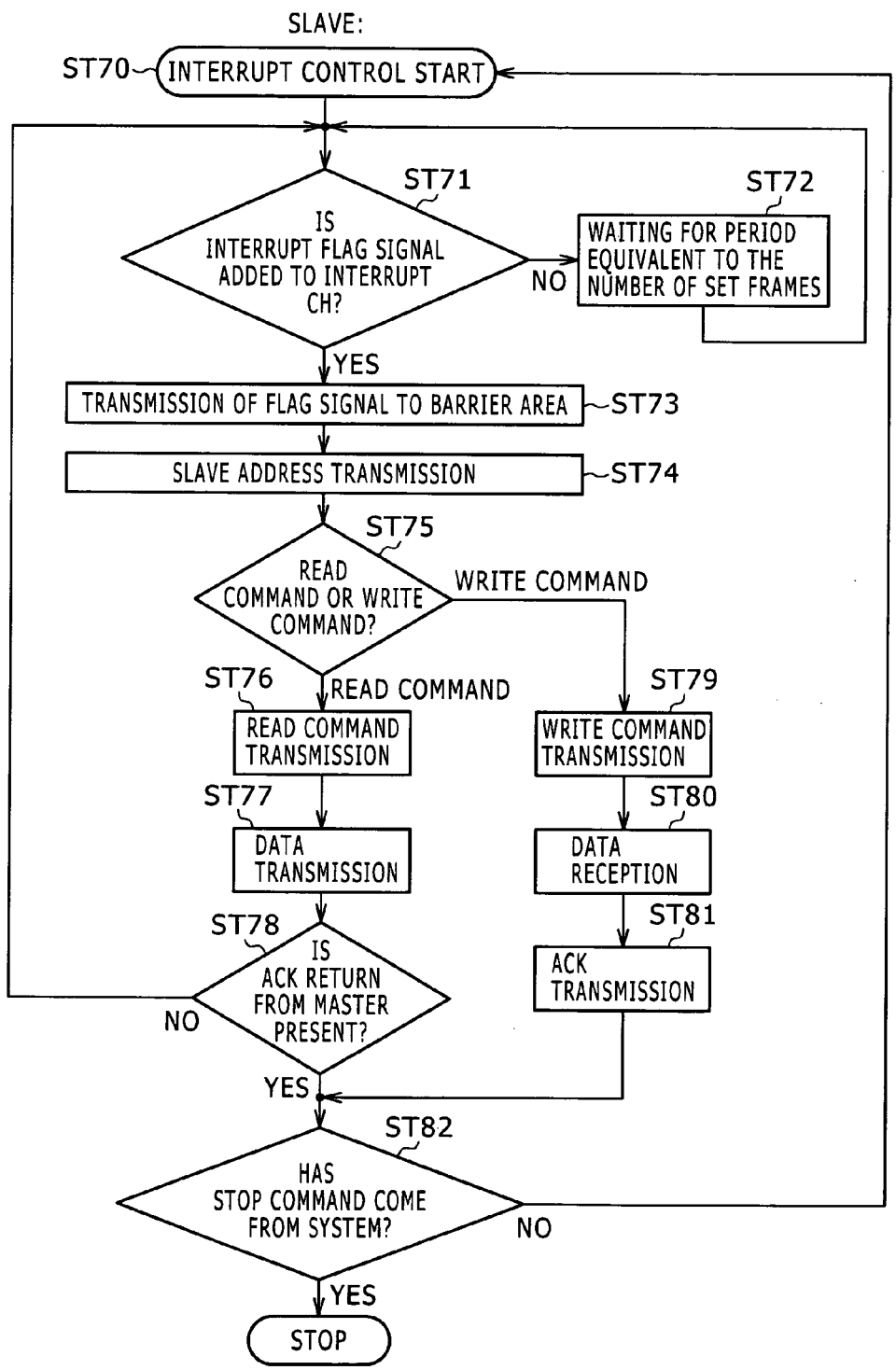
FIG. 19 is a flowchart for explaining the interrupt communication control operation of the slave device according to the embodiment.

For data transmission and reception, the master device 20 exchanges data in accordance with the control flow of FIG. 18, and the slave device 30 exchanges data in accordance with the control flow of FIG. 19.

In transmission of self-data from the slave device 30 to the master device 20, the slave device 30 transmits its own "SA (Slave Address)"+"RC (read command)"+"D (Data)."

Upon receiving the data, the master device 20 transmits the acknowledge ACK to the slave device 30.

When the slave device 30 gets the master device 20 to send data, the slave device 30 transmits its own "SA (Slave Address)"+"WC (write command)."

The master device 20 returns "D (Data)" to the slave device 30. Upon receiving this return, the slave device 30 transmits the acknowledge ACK to the master device 20.

When the master device 20 transmits data to the slave device 30 or the master device 20 makes the slave device 30 to send data, the same data exchange as that in polling communication is performed by interrupt.

The specific operation of the communication control according to the present embodiment will be described below in association with FIGS. 15 to 19.

[Activation]

Figure 15:
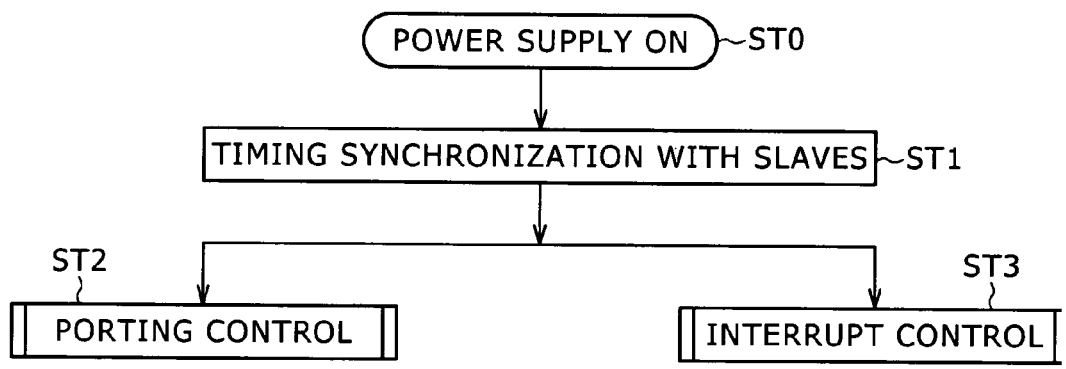
FIG. 15 is a flowchart for explaining control in activation of the master device according to the embodiment.

FIG. 15 is a flowchart for explaining control in activation of the master device according to the present embodiment.

When the power supply is turned on, the master device 20 achieves timing synchronization with the slave devices 30-1 to 30-X (ST1), and starts porting control (ST2) and interrupt control (ST3).

[Porting (Polling) Control by Master Device]

FIG. 16 is a flowchart for explaining the polling communication control operation of the master device according to the present embodiment.

The master device 20 sets a slave address (ST11) and determines whether or not the master device 20 is communicating with the corresponding slave device 30 by interrupt control (ST12).

If the master device 20 determines that the master device 20 is communicating with the corresponding slave device 30, the master device 20 sets the slave address to the address of the next slave device 30 (ST13) and makes the determination of the step ST12.

If the master device 20 determines that the master device 20 is not communicating with the corresponding slave device 30 in the step ST12, the master device 20 outputs a barrier signal that is a signal all of which is at the high level (ST14) and transmits the slave address (ST15).

Next, the master device 20 determines whether the command is a read command or a write command (ST16).

If the master device 20 determines that the command is a read command (ST16, ST17), the master device 20 receives data from the corresponding slave device 30. Upon receiving the data, the master device 20 transmits the acknowledge ACK to the slave device 30 (ST19).

If the master device 20 determines that the command is a write command in the step ST16 (ST20), the master device 20 transmits data to the slave device 30 (ST21) and determines whether or not the return of the acknowledge ACK from the slave device 30 is present (ST22).

If the master device 20 has not received the acknowledge ACK, the master device 20 retransmits data to the slave device 30 by interrupt control.

If the master device 20 has received the acknowledge ACK, the master device 20 determines whether or not a stop command has come from the system (ST24). If the stop command has come, the master device 20 stops the control.

If the stop command has not come, the master device 20 sets the address of the next slave device 30 (ST25) and repeats the processing from the step ST12.

[Porting (Polling) Control by Slave Device]

FIG. 17 is a flowchart for explaining the polling communication control operation of the slave device according to the present embodiment.

The slave device 30 receives a slave address (ST31) and determines whether or not this address is its own address (ST32).

If the address is not its own address, the slave device 30 waits until the next address comes (ST33).

If the slave device 30 determines that the received address is its own address in the step ST32, the slave device 30 receives a command (ST34) and determines whether the command is a read command or a write command (ST35).

If the slave device 30 determines that the command is a read command, the slave device 30 transmits data (ST36) and determines whether or not the return of the acknowledge ACK from the master device 20 is present (ST37).

If the slave device 30 determines that the return of the acknowledge ACK is absent, the slave device 30 retransmits data to the master device 20 by interrupt control (ST38).

If the slave device 30 determines that the command is a write command in the step ST35, the slave device 30 receives data (ST39) and returns the acknowledge ACK to the master device 20 (ST40).

Upon receiving the acknowledge ACK in the step ST37 or transmitting the acknowledge ACK in the step ST40, the slave device 30 determines whether or not a stop command has come from the system (ST41). If the stop command has come, the slave device 30 stops the control.

If the stop command has not come, the slave device 30 repeats the processing from the step ST31.

[Interrupt Control by Master Device]

FIG. 18 is a flowchart for explaining the interrupt communication control operation of the master device according to the present embodiment.

The master device 20 determines whether or not a signal of the interrupt flag IFLG is added to the interrupt channel INCH (ST51).

If the master device 20 determines that the interrupt flag is added, the master device 20 receives a slave address (ST52) and receives a command (ST53).

The master device 20 determines whether the received command is a read command or a write command (ST54).

If the master device 20 determines that the received command is a read command, the master device 20 receives data from the corresponding slave device 30 (ST55). Upon receiving the data, the master device 20 transmits the acknowledge ACK to the slave device 30 (ST56).

If the master device 20 determines that the received command is a write command in the step ST54, the master device 20 transmits data to the slave device 30 (ST57) and determines whether or not the return of the acknowledge ACK from the slave device 30 is present (ST58).

Upon receiving the acknowledge ACK or transmitting the acknowledge ACK in the step ST56, the master device 20 determines whether or not a stop command has come from the system (ST59). If the stop command has come, the master device 20 stops the control.

If the stop command has not come, the master device 20 repeats the processing from the step ST51.

If the master device 20 determines that the interrupt flag is not added in the step ST51, the master device 20 determines whether or not retransmission data is present (ST60).

If the master device 20 determines that retransmission data is present or determines that the return of the acknowledge ACK from the slave device 30 is absent in the step ST58, the master device 20 transmits the address of the slave device 30 as the retransmission destination (ST61).

Next, the master device 20 determines whether the command is a read command or a write command (ST62).

If the master device 20 determines that the command is a read command (ST62, ST63), the master device 20 receives data from the corresponding slave device 30 (ST64). Upon receiving the data, the master device 20 transmits the acknowledge ACK to the slave device 30 (ST65).

If the master device 20 determines that the command is a write command in the step ST62 (ST66), the master device 20 transmits data to the slave device 30 (ST67) and determines whether or not the return of the acknowledge ACK from the slave device 30 is present (ST68).

Upon receiving the acknowledge ACK in the step ST68 or transmitting the acknowledge ACK in the step ST65, the master device 20 moves to the processing of the step ST59, where the master device 20 determines whether or not a stop command has come from the system.

If the return of the acknowledge ACK from the slave device 30 is absent, the master device 20 repeats the processing from the step ST60.

[Interrupt Control by Slave Device]

FIG. 19 is a flowchart for explaining the interrupt communication control operation of the slave device according to the present embodiment.

The slave device 30 determines whether or not a signal of the interrupt flag IFLG is added to the interrupt channel INCH (ST71).

If the interrupt flag is not added, the slave device 30 waits for the period equivalent to the number of set frames (set flag communication slot+data communication slot) (ST72).

If the slave device 30 determines that the interrupt flag is added, the slave device 30 transmits a flag signal of the barrier area (ST73) and transmits a slave address signal (ST74).

Next, the slave device 30 determines whether the command to be transmitted is a read command or a write command (ST75).

If the slave device 30 determines that the command is a read command, the slave device 30 transmits the read command (ST75, ST76) and transmits data (ST77). Upon transmitting the data, the slave device 30 determines whether or not the return of the acknowledge ACK from the master device 20 is present (ST78).

If the return of the acknowledge ACK from the master device 20 is absent, the slave device 30 repeats the processing from the step ST71.

If the slave device 30 determines that the command is a write command in the step ST75, the slave device 30 transmits the write command (ST79) and receives data from the master device 20 (ST80). Then, the slave device 30 transmits the acknowledge ACK to the master device 20 (ST81).

When the acknowledge ACK is transmitted or the return of the acknowledge ACK is present in the step ST78, the slave device 30 determines whether or not a stop command has come from the system (ST82). If the stop command has come, the slave device 30 stops the control.

If the stop command has not come, the slave device 30 repeats the processing from the step ST71.

In the present embodiment, different channels are allocated to polling serial communication between the single master device 20 and the plural slave devices 30 and interrupt serial communication from the slave, and communication is carried out with multiplexing.

Therefore, in the present embodiment, in communication, the polling communication channel can carry out the communication without being hindered by interrupt communication, which makes it possible to keep the polling cycle time thereof constant.

Although the present embodiment is described above by taking as an example the case in which the line of the communication bus 40 is a single line, the present invention can be applied also to the case in which the communication bus 40 is formed of differential lines.

It is also possible to separate the clock and send it by a different line, instead of transmitting the clock together.

Furthermore, it is possible to employ various forms such as a form in which the slot length is changed and a form in which not a parity but error code data is sent.

The present application contains subject matter related to that disclosed in Japanese Priority Patent Application JP 2009-240773 filed in the Japan Patent Office on Oct. 19, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A communication centralized control system comprising:
   one master device;
   a communication bus; and
   a plurality of slave devices configured to be connected to the master device by the communication bus, wherein:
      the master device and the plurality of slave devices are capable of bidirectional communication via the communication bus, and
      different channels are allocated to at least polling communication from the master device to the plurality of slave devices and interrupt communication from the plurality of slave devices to the master device, the polling communication and interrupt communication being carried out with multiplexing on a same line of the communication bus.

2. The communication centralized control system according to claim 1, wherein the master device is configured to:
   generate polling master data,
   modulate generated polling master data,
   transfer modulated polling master data to a polling communication channel of the communication bus,
   receive modulated interrupt slave data transferred through an interrupt communication channel of the communication bus, and
   demodulate the received interrupt slave data.

3. The communication centralized control system according to claim 1, wherein each slave device of the plurality of slave devices is configured to:
   generate interrupt slave data,
   modulate generated interrupt slave data,
   transfer modulated interrupt slave data to an interrupt communication channel of the communication bus,
   receive modulated polling master data transferred through a polling communication channel of the communication bus, and
   demodulate the received polling master data.

4. The communication centralized control system according to claim 1, wherein the master device is configured to:
   generate polling master data,
   modulate generated polling master data,
   generate interrupt master data,
   modulate generated interrupt master data,
   multiplex the modulated polling master data and the modulated interrupt master data and transfer the multiplexed data to the different channels of the communication bus,
   receive modulated interrupt slave data and polling slave data that are transferred through the different channels of the communication bus, and
   demodulate the received interrupt slave data and the received polling slave data.

5. The communication centralized control system according to claim 1, wherein each slave device of the plurality of slave devices is configured to:
   generate interrupt slave data,
   modulate generated interrupt slave data,
   generate polling slave data,
   modulate generated polling slave data,
   transfer modulated interrupt slave data and modulated polling slave data to the different channels of the communication bus,
   receive modulated polling master data and interrupt master data that are transferred through the different channels of the communication bus, and
   demodulate the received polling master data and the received interrupt master data.

6. The communication centralized control system according to claim 1, wherein the master device and each slave device of the plurality of slave devices carry out communication control via the communication bus depending on specification of a slave address and whether an acknowledge signal is present or absent.

7. The communication centralized control system according to claim 6, wherein the master device and the plurality of slave devices are configured such that, after sending data via polling communication or interrupt communication, if the acknowledge signal is absent, the master device or the slave device of the plurality of slave devices that sent the data resends the data via interrupt communication.

8. The communication centralized control system according to claim 1, wherein:
   the master device and the plurality of slave devices are configured to carry out polling communication in units of polling slots and to carry out interrupt communication in units of interrupt communication slots, and
   a starting timing of each interrupt communication slot is synchronized to correspond to a starting timing of a polling communication slot.

9. The communication centralized control system according to claim 8, wherein:
   the interrupt communication slots comprise flag communication slots and data communication slots, and
   the plurality of slave devices are configured such that, when carrying out interrupt communication, a given one of the plurality of slave devices that is carrying out interrupt communication first checks whether an interrupt flag is set and:
      if an interrupt flag other than an interrupt flag of the given one of the plurality of slave devices is set, waits until a time corresponding to a next flag communication slot to retry carrying out interrupt communication;
      if no interrupt flag is set, sets an interrupt flag and continues interrupt communication; and if the interrupt flag of the given one of the plurality of slave devices is set and a stop command has not issued, sets the interrupt flag again and continues interrupt communication.

10. A communication centralized control method comprising the steps of:
- connecting one master device and a plurality of slave devices in such a way that the master device and the plurality of slave devices are capable of bidirectional communication by a communication bus; and
- allocating different channels to at least polling communication from the master device to the plurality of slave devices and interrupt communication from the plurality of slave devices to the master device, and carrying out the polling communication and the interrupt communication with multiplexing on a same line of the communication bus.

11. The communication centralized control method according to claim 10, wherein the master device is configured to:
- generate polling master data,
- modulate generated polling master data,
- transfer modulated polling master data to a polling communication channel of the communication bus,
- receive modulated interrupt slave data transferred through an interrupt communication channel of the communication bus, and
- demodulate the received interrupt slave data.

12. The communication centralized control method according to claim 10, wherein each slave device of the plurality of slave devices is configured to:
- generate interrupt slave data,
- modulate generated interrupt slave data,
- transfer modulated interrupt slave data to an interrupt communication channel of the communication bus,
- receive modulated polling master data transferred through a polling communication channel of the communication bus, and
- demodulate the received polling master data.

13. The communication centralized control method according to claim 10, wherein the master device is configured to:
- generate polling master data,
- modulate generated polling master data,
- generate interrupt master data,
- modulate generated interrupt master data,
- multiplex the modulated polling master data and the modulated interrupt master data and transfer the multiplexed data to the different channels of the communication bus,
- receive modulated interrupt slave data and polling slave data that are transferred through the different channels of the communication bus, and
- demodulate the received interrupt slave data and the received polling slave data.

14. The communication centralized control method according to claim 10, wherein each slave device of the plurality of slave devices is configured to:
- generate interrupt slave data,
- modulate generated interrupt slave data,
- generate polling slave data,
- modulate generated polling slave data,
- transfer modulated interrupt slave data and modulated polling slave data to the different channels of the communication bus,
- receive modulated polling master data and interrupt master data that are transferred through the different channels of the communication bus, and
- demodulate the received polling master data and the received interrupt master data.

15. The communication centralized control method according to claim 10, wherein the polling communication and the interrupt communication between the master device and the plurality of slave devices are controlled on the basis of a specified slave address and whether an acknowledge signal is present or absent.

16. The communication centralized control method according to claim 15, the method further comprising, after sending data via polling communication or interrupt communication, if the acknowledge signal is absent, resending the data via interrupt communication.

17. The communication centralized control method according to claim 10, wherein:
- polling communication is carried out in units of polling slots and interrupt communication is carried out in units of interrupt communication slots, and
- a starting timing of each interrupt communication slot is synchronized to correspond to a starting timing of a polling communication slot.

18. The communication centralized control method according to claim 17, wherein:
- the interrupt communication slots comprise flag communication slots and data communication slots, and
- when carrying out interrupt communication, a given one of the plurality of slave devices that is carrying out interrupt communication first checks whether an interrupt flag is set and:
  - if an interrupt flag other than an interrupt flag of the given one of the plurality of slave devices is set, waits until a time corresponding to a next flag communication slot to retry carrying out interrupt communication;
  - if no interrupt flag is set, sets an interrupt flag and continues interrupt communication; and
  - if the interrupt flag of the given one of the plurality of slave devices is set and a stop command has not issued, sets the interrupt flag again and continues interrupt communication.

* * * * *